(12) United States Patent
Hatakenaka

(10) Patent No.: US 12,282,864 B2
(45) Date of Patent: Apr. 22, 2025

(54) LEARNED MODEL GENERATION METHOD, APPARATUS, AND COMPUTER READABLE RECORDING MEDIUM

(71) Applicant: Panasonic Intellectual Property Management Co., Ltd., Osaka (JP)

(72) Inventor: Shinya Hatakenaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1095 days.

(21) Appl. No.: 17/183,417

(22) Filed: Feb. 24, 2021

(65) Prior Publication Data
US 2021/0279610 A1 Sep. 9, 2021

(30) Foreign Application Priority Data
Mar. 9, 2020 (JP) ................................. 2020-040274

(51) Int. Cl.
G06N 5/04 (2023.01)
G05B 19/18 (2006.01)
G05B 19/406 (2006.01)
G06N 20/00 (2019.01)

(52) U.S. Cl.
CPC ............ *G06N 5/04* (2013.01); *G05B 19/188* (2013.01); *G05B 19/406* (2013.01); *G06N 20/00* (2019.01); *G05B 2219/45239* (2013.01)

(58) Field of Classification Search
CPC ........ G06N 5/04; G06N 20/00; G05B 19/188; G05B 19/406; G05B 2219/45239; G05B 13/042; G06Q 10/20; G06Q 50/04; H01M 10/0431; Y02E 60/10; Y02P 90/30; Y02P 70/50

See application file for complete search history.

(56) References Cited

U.S. PATENT DOCUMENTS

| | | | |
|---|---|---|---|
| 6,327,774 B1 * | 12/2001 | Cheon ..................... | H01M 4/04 29/730 |
| 10,811,652 B2 * | 10/2020 | Shinomiya ............. | B65H 21/00 |
| 11,500,361 B2 * | 11/2022 | Hatakenaka ....... | G05B 19/4183 |
| 11,511,554 B2 * | 11/2022 | Mikoshiba ......... | G05B 13/0265 |
| 11,658,346 B2 * | 5/2023 | Hatakenaka ....... | G05B 23/0283 429/94 |

(Continued)

FOREIGN PATENT DOCUMENTS

| | | | | |
|---|---|---|---|---|
| CN | 108695559 A | * | 10/2018 | ........ H01M 10/0587 |
| JP | 2006-145298 | | 6/2006 | |

(Continued)

*Primary Examiner* — Darrin D Dunn
*Assistant Examiner* — Olvin Lopez Alvarez
(74) *Attorney, Agent, or Firm* — Wenderoth, Lind & Ponack L.L.P.

(57) ABSTRACT

A facility state diagnosis model generator generates a shape data group in which any of a plurality of winding cores is correlated with any of a plurality of pieces of group data, and generates a replacement data group in which correspondence relationships between the winding cores and the group data are replaced with each other in all combinations of the plurality of winding cores and the plurality of pieces of group data, and generates or updates a plurality of learned models indicating that a cause of a defect is any of the plurality of winding cores by using the replacement data group.

6 Claims, 28 Drawing Sheets

(56) References Cited

U.S. PATENT DOCUMENTS

| | | | | |
|---|---|---|---|---|
| 11,764,391 B2* | 9/2023 | Hatakenaka | ...... | H01M 10/0409 |
| | | | | 702/184 |
| 11,782,433 B2* | 10/2023 | Hatakenaka | ........... | G06N 20/00 |
| | | | | 702/184 |
| 2010/0281685 A1* | 11/2010 | Hori | .................. | H01M 10/4285 |
| | | | | 29/761 |
| 2015/0323309 A1 | 11/2015 | Kabetani et al. | | |
| 2016/0308240 A1 | 10/2016 | Kabetani et al. | | |
| 2020/0348242 A1* | 11/2020 | Watanabe | .............. | G01N 23/18 |

FOREIGN PATENT DOCUMENTS

| | | | | | |
|---|---|---|---|---|---|
| JP | 2006145298 A | * | 6/2006 | ............ | G01B 11/00 |
| JP | 2017-167708 | | 9/2017 | | |
| JP | 2018-113198 | | 7/2018 | | |
| JP | 2018-170103 | | 11/2018 | | |
| JP | 7390617 B2 | * | 12/2023 | ............ | G06N 20/00 |
| WO | 2013/168321 | | 11/2013 | | |

\* cited by examiner

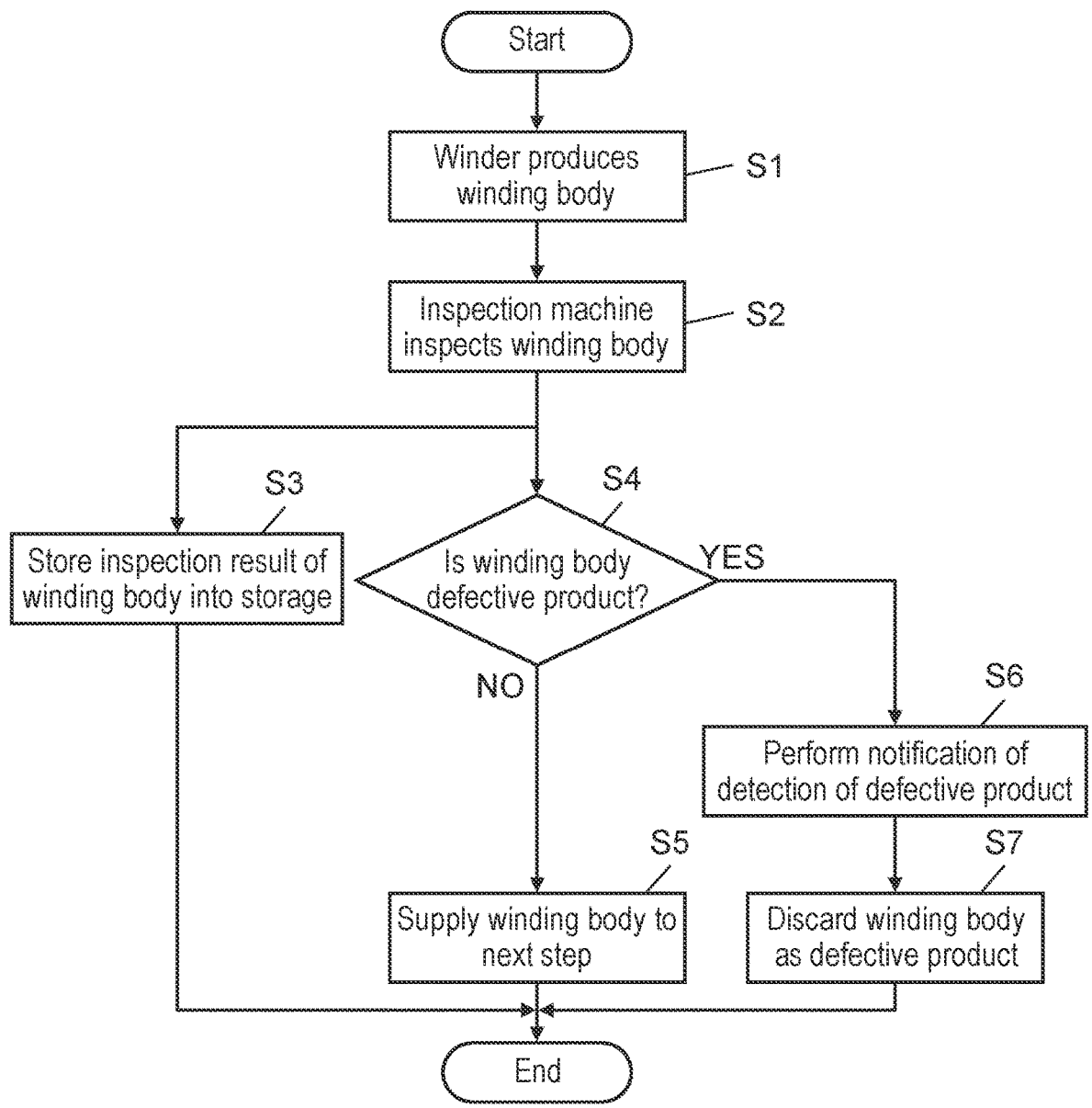

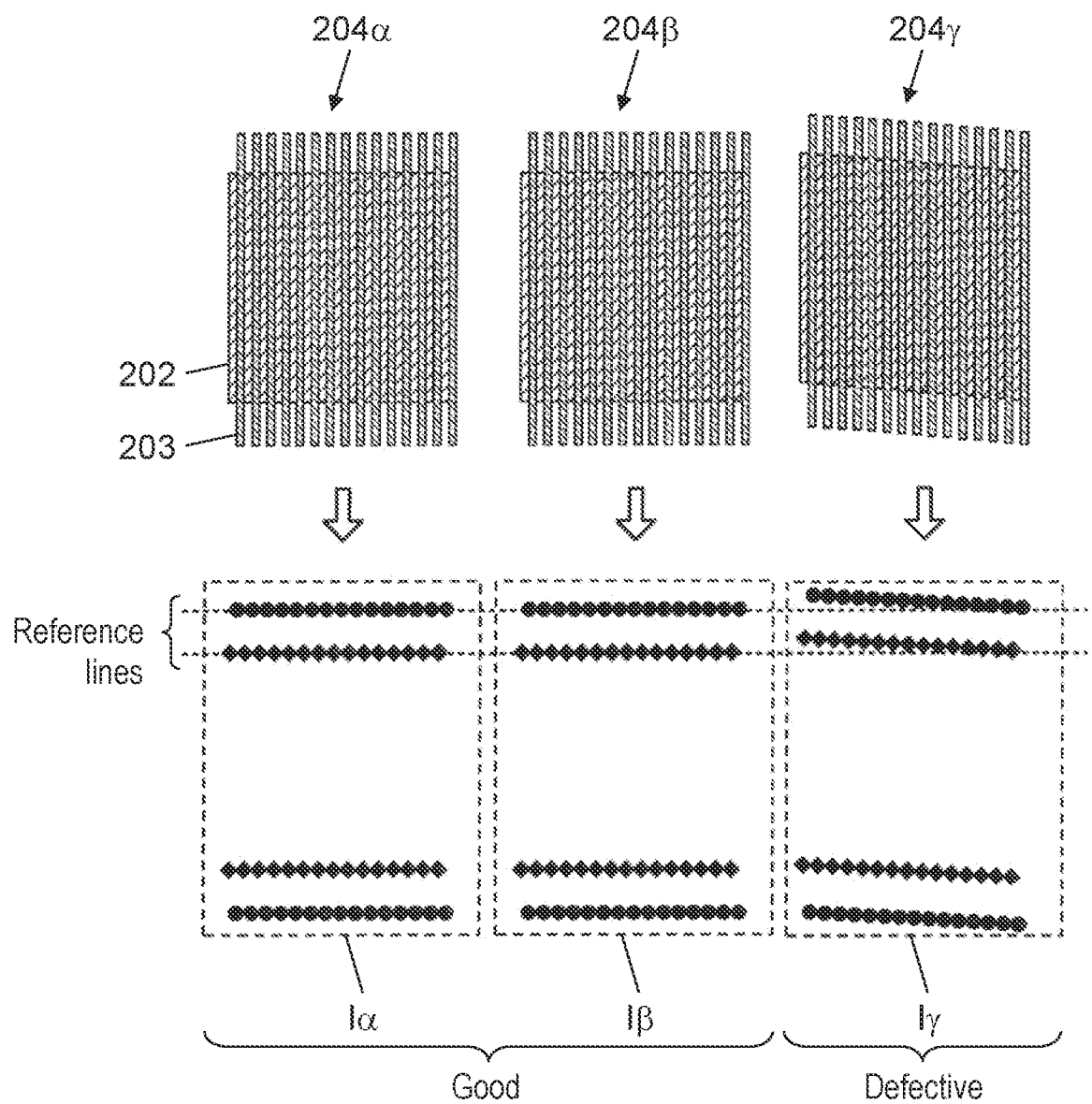

FIG. 7A
PD

| Production date and time | Facility | Inspection result | First sheet material | Second sheet material | Shape data group ID |
|---|---|---|---|---|---|
| 2018/2/15 12:00:00 | A | Good | C001-01 | A001-01 | 0001 |
| 2018/2/15 12:01:00 | B | Defective | C001-02 | A001-02 | 0002 |
| 2018/2/15 12:02:30 | C | Good | C001-03 | A001-03 | 0003 |
| ... | ... | ... | ... | ... | ... |

FIG. 7B

| Shape data group ID | 0001 | 0002 | 0003 | ... |
|---|---|---|---|---|
| Shape data group | | | | ... |

| Maintenance date and time | Facility | Maintenance work content |
|---|---|---|
| 2018/2/15 12:00:00 | A | First winding core adjustment |
| 2018/2/15 12:01:00 | B | Third winding core adjustment |
| 2018/2/20 12:00:00 | C | Second winding core adjustment |
| ... | ... | ... |

FIG. 17A

| | Maintenance work | Maintenance plan |
|---|---|---|
| Maintenance group 1 | First winding core adjustment<br>First winding core cleaning<br>First winding core replacement | Maintenance of first winding core |
| Maintenance group 2 | Third winding core adjustment<br>Third winding core cleaning<br>Third winding core replacement | Maintenance of third winding core |
| Maintenance group 3 | Second winding core adjustment<br>Second winding core cleaning<br>Second winding core replacement | Maintenance of second winding core |
| ... | ... | ... |

| | Maintenance plan ID | Facility | Maintenance plan | Aggregation value |
|---|---|---|---|---|
| Maintenance group 1 | 0001 | A | Maintenance of first winding core | 0.9 |
| Maintenance group 2 | 0002 | A | Maintenance of third winding core | 0.7 |
| Maintenance group 3 | 0003 | A | Maintenance of second winding core | 0.6 |
| ... | ... | ... | ... | ... |

FIG. 26A
After maintenance (defect ratio $Nf_{after}$ = 0%)
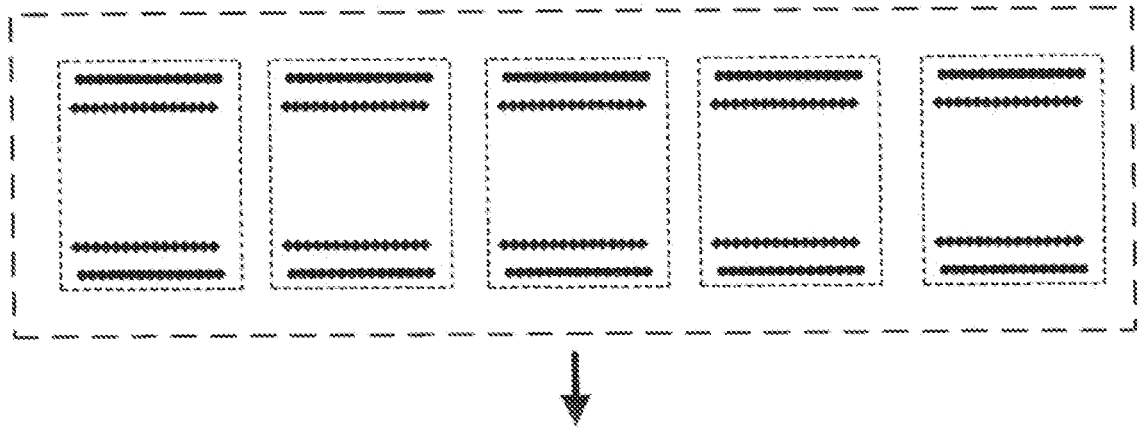
Compare $Nf_{after}$ with predetermined threshold value (20%)
FIG. 26B
After maintenance (defect ratio $N_{after}$ = 40%)
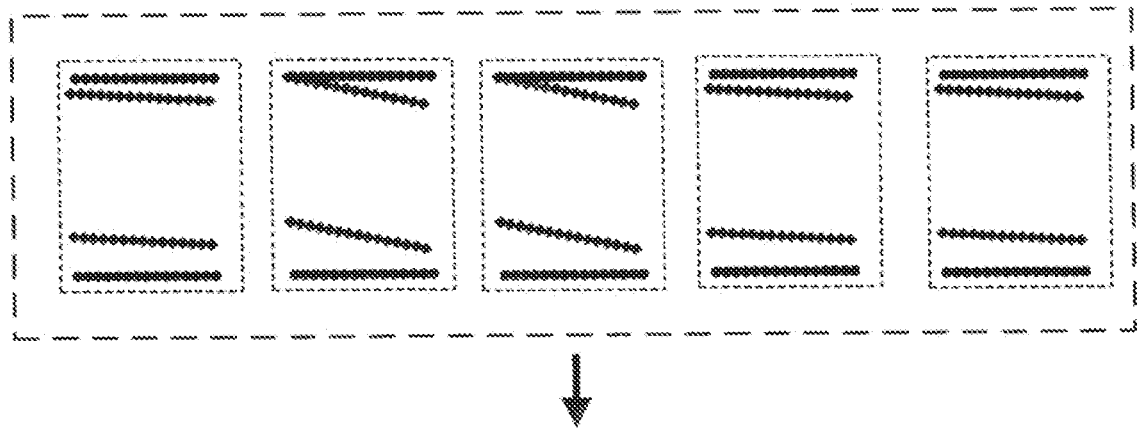
Compare $Nf_{after}$ with predetermined threshold value (20%)

LEARNED MODEL GENERATION METHOD, APPARATUS, AND COMPUTER READABLE RECORDING MEDIUM

BACKGROUND

1. Technical Field

The present disclosure relates to a learned model generation method, an apparatus, and a computer readable recording medium used to display information regarding maintenance of a production facility.

2. Description of the Related Art

It is common practice to provide a maintenance system in a certain facility in order to prevent deterioration and failure and to maintain a normal operation. Japanese Patent Unexamined Publication No. 2017-167708 discloses a maintenance system that monitors the occurrence of abnormalities such as a drainage pump failure and a switchboard ground fault in a substation, and, in a case where an abnormality occurs, notifies a facility related person of the abnormality, and stores information regarding maintenance work performed for abnormalities performed by the facility related person who receives the notification.

SUMMARY

According to an aspect of the present disclosure, there is provided a learned model generation method of generating a learned model for maintenance of a winding apparatus including a first supply mechanism that supplies a first electrode sheet, a second supply mechanism that supplies a second electrode sheet, a first bonding roller that is provided on a first electrode sheet side, a second bonding roller that is provided on a second electrode sheet side, and is paired with the first bonding roller to bond the first electrode sheet and the second electrode sheet to each other, a first winding core, a second winding core, a drive mechanism that moves the first winding core to a predetermined winding position, winds the first electrode sheet and the second electrode sheet on the first winding core in an overlapping manner, moves the second winding core to the predetermined winding position, and winds the first electrode sheet and the second electrode sheet on the second winding core in an overlapping manner, and a sensor that reads a first end surface of the first electrode sheet and a second end surface of the second electrode sheet along a radial direction of a first winding body in which the first electrode sheet and the second electrode sheet are wound in an overlapping manner by a plurality of turns on the first winding core, and reads a third end surface of the first electrode sheet and a fourth end surface of the second electrode sheet along a radial direction of a second winding body in which the first electrode sheet and the second electrode sheet are wound in an overlapping manner by a plurality of turns on the second winding core, the learned model generation method including acquiring, from the sensor, first group data indicating a position of the first end surface read along the radial direction of the first winding body, second group data indicating a position of the second end surface read along the radial direction of the first winding body, third group data indicating a position of the third end surface read along the radial direction of the second winding body, and fourth group data indicating a position of the fourth end surface read along the radial direction of the second winding body; generating a first learned model for outputting information indicating that a cause of a defect is the second winding core by using the third group data and the fourth group data in a case where it is determined that the second winding body has the defect on the basis of a positional relationship among continuous positions of the third end surface indicated by the third group data, continuous positions of the fourth end surface indicated by the fourth group data, and reference lines; acquiring, from the sensor, fifth group data indicating a position of a fifth end surface of the first electrode sheet along a radial direction of a third winding body in which the first electrode sheet and the second electrode sheet are wound in an overlapping manner by a plurality of turns on the first winding core and sixth group data indicating a position of a sixth end surface of the second electrode sheet along the radial direction of the third winding body, and generating, by using the first group data and the second group data, and the third group data and the fourth group data, a second learned model to which the fifth group data and the sixth group data are input in a case where it is determined that the third winding body has a defect on the basis of a positional relationship among continuous positions of the fifth end surface indicated by the fifth group data, continuous positions of the sixth end surface indicated by the sixth group data, and the reference lines and from which information indicating that the third winding body has the defect and a cause of the defect is the first winding core is output.

According to another aspect of the present disclosure, there is provided an apparatus outputting information for displaying information regarding maintenance of a winding apparatus including a first supply mechanism that supplies a first electrode sheet, a second supply mechanism that supplies a second electrode sheet, a first bonding roller that is provided on a first electrode sheet side, a second bonding roller that is provided on a second electrode sheet side, and is paired with the first bonding roller to bond the first electrode sheet and the second electrode sheet to each other, a first winding core, a second winding core, a drive mechanism that moves the first winding core to a predetermined winding position, winds the first electrode sheet and the second electrode sheet on the first winding core in an overlapping manner, moves the second winding core to the predetermined winding position, and winds the first electrode sheet and the second electrode sheet on the second winding core in an overlapping manner, and a sensor that reads a first end surface of the first electrode sheet and a second end surface of the second electrode sheet along a radial direction of a first winding body in which the first electrode sheet and the second electrode sheet are wound in an overlapping manner by a plurality of turns on the first winding core, and reads a third end surface of the first electrode sheet and a fourth end surface of the second electrode sheet along a radial direction of a second winding body in which the first electrode sheet and the second electrode sheet are wound in an overlapping manner by a plurality of turns on the second winding core, the apparatus including an acquirer that acquires, from the sensor, first group data indicating a position of the first end surface read along the radial direction of the first winding body, second group data indicating a position of the second end surface read along the radial direction of the first winding body, third group data indicating a position of the third end surface read along the radial direction of the second winding body, and fourth group data indicating a position of the fourth end surface read along the radial direction of the second winding body; and a model generator that generates a first learned model for outputting information indicating that a cause of a defect is the second winding core by using the third group data and the fourth group data in a case where it is determined that the second winding body has the defect on the basis of a positional relationship among continuous positions of the third end surface indicated by the third group data, continuous positions of the fourth end surface indicated by the fourth group data, and reference lines, acquires, from the sensor, fifth group data indicating a position of a fifth end surface of the first electrode sheet along a radial direction of a third winding body in which the first electrode sheet and the second electrode sheet are wound in an overlapping manner by a plurality of turns on the first winding core and sixth group data indicating a position of a sixth end surface of the second electrode sheet along the radial direction of the third winding body, and generates, by using the first group data and the second group data, and the third group data and the fourth group data, a second learned model to which the fifth group data and the sixth group data are input in a case where it is determined that the third winding body has a defect on the basis of a positional relationship among continuous positions of the fifth end surface indicated by the fifth group data, continuous positions of the sixth end surface indicated by the sixth group data, and the reference lines and from which information indicating that the third winding body has the defect and a cause of the defect is the first winding core is output.

A computer readable recording medium storing a program executed by a computer generating a learned model for maintenance of a winding apparatus including a first supply mechanism that supplies a first electrode sheet, a second supply mechanism that supplies a second electrode sheet, a first bonding roller that is provided on a first electrode sheet side, a second bonding roller that is provided on a second electrode sheet side, and is paired with the first bonding roller to bond the first electrode sheet and the second electrode sheet to each other, a first winding core, a second winding core, a drive mechanism that moves the first winding core to a predetermined winding position, winds the first electrode sheet and the second electrode sheet on the first winding core in an overlapping manner, moves the second winding core to the predetermined winding position, and winds the first electrode sheet and the second electrode sheet on the second winding core in an overlapping manner, and a sensor that reads a first end surface of the first electrode sheet and a second end surface of the second electrode sheet along a radial direction of a first winding body in which the first electrode sheet and the second electrode sheet are wound in an overlapping manner by a plurality of turns on the first winding core, and reads a third end surface of the first electrode sheet and a fourth end surface of the second electrode sheet along a radial direction of a second winding body in which the first electrode sheet and the second electrode sheet are wound in an overlapping manner by a plurality of turns on the second winding core, the program causing the computer to execute a procedure of acquiring, from the sensor, first group data indicating a position of the first end surface read along the radial direction of the first winding body, second group data indicating a position of the second end surface read along the radial direction of the first winding body, third group data indicating a position of the third end surface read along the radial direction of the second winding body, and fourth group data indicating a position of the fourth end surface read along the radial direction of the second winding body; a procedure of generating a first learned model for outputting information indicating that a cause of a defect is the second winding core by using the third group data and the fourth group data in a case where it is determined that the second winding body has the defect on the basis of a positional relationship among continuous positions of the third end surface indicated by the third group data, continuous positions of the fourth end surface indicated by the fourth group data, and reference lines; acquiring, from the sensor, fifth group data indicating a position of a fifth end surface of the first electrode sheet along a radial direction of a third winding body in which the first electrode sheet and the second electrode sheet are wound in an overlapping manner by a plurality of turns on the first winding core and sixth group data indicating a position of a sixth end surface of the second electrode sheet along the radial direction of the third winding body, and generating, by using the first group data and the second group data, and the third group data and the fourth group data, a second learned model to which the fifth group data and the sixth group data are input in a case where it is determined that the third winding body has a defect on the basis of a positional relationship among continuous positions of the fifth end surface indicated by the fifth group data, continuous positions of the sixth end surface indicated by the sixth group data, and the reference lines and from which information indicating that the third winding body has the defect and a cause of the defect is the first winding core is output.

BRIEF DESCRIPTION OF THE DRAWINGS

FIG. 2 is a flowchart for describing all process steps in the maintenance display apparatus;

FIG. 5 is a schematic diagram illustrating examples of sectional shapes and shape data of winding bodies in a case where a winding body wound on a certain winding core has a defect;

FIG. 7A is a diagram exemplifying production result data;

FIG. 7B is a diagram exemplifying production result data;

FIG. 8 is a diagram exemplifying maintenance result data;

FIG. 17A is a diagram illustrating a specific example of maintenance group information;

FIG. 17B is a diagram illustrating a specific example of a maintenance plan list;

FIG. 26A is a diagram for describing a modification example of a method of determining whether or not maintenance work is effective in the maintenance effect determinator in a learning process;

FIG. 26B is a diagram for describing a modification example of a method of determining whether or not maintenance work is effective in the maintenance effect determinator in the learning process;

DETAILED DESCRIPTIONS

In the technique disclosed in Japanese Patent Unexamined Publication No. 2017-167708, the facility related person is notified after an abnormality occurs in the facility. Thus, the maintenance is performed by the facility related person after an abnormality occurs. In a case where the maintenance is performed after an abnormality occurs, it is necessary to stop an operation of the facility. Therefore, it is desirable that a notification is performed at the time at which the maintenance is determined as being necessary before the occurrence of the abnormality. Thus, it is required to detect a sign of an abnormality occurring in a facility.

An object of the present disclosure is to provide a learned model generation method, an apparatus, and a computer readable recording medium for detecting a sign of an abnormality.

Hereinafter, each exemplary embodiment of the present disclosure will be described in detail with reference to the drawings. However, detailed description more than necessary, for example, detailed description of well-known matters and repeated description of substantially the same configuration may be omitted.

The following description and referenced drawings are provided for those skilled in the art to understand the present disclosure and are not intended to limit the scope of the claims of the present disclosure.

First Exemplary Embodiment

Maintenance Display Apparatus 100 and Winding Apparatus 200

Figure 1:
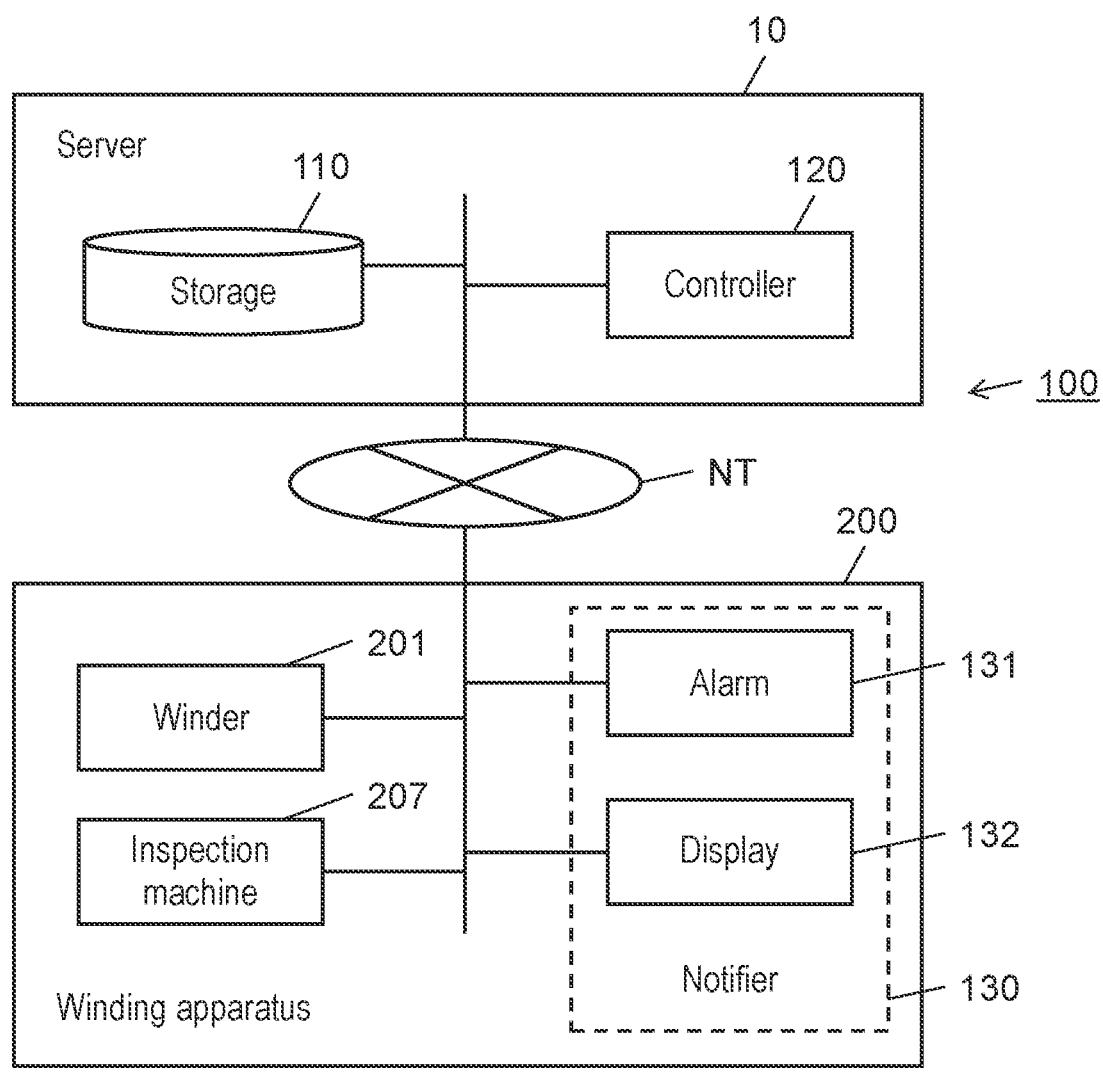
FIG. 1 is a network diagram including a maintenance display apparatus and a winding apparatus to which the maintenance display apparatus is applied.

FIG. 1 is a network diagram including maintenance display apparatus 100 according to a first exemplary embodiment of the present disclosure and winding apparatus 200 to which maintenance display apparatus 100 is applied. Maintenance display apparatus 100 described in the present exemplary embodiment is an apparatus that performs maintenance display for winding apparatus 200 producing a lithium ion secondary battery. In the example illustrated in FIG. 1, maintenance display apparatus 100 is applied to single winding apparatus 200, but the present disclosure is not limited thereto, and a single maintenance display apparatus may be applied to a plurality of winding apparatuses. In the present exemplary embodiment, maintenance display apparatus 100 is described as an apparatus, but the present disclosure is not limited thereto, and a maintenance display system in which individual constituents are connected to each other via a network may be used.

Maintenance display apparatus 100 includes server 10 having storage 110 and controller 120, and notifier 130. Server 10 is communicably connected to winding apparatus 200 via network NT. Network NT is, for example, a public network such as the Internet, or a local network such as an in-company local area network (LAN).

Server 10 is, for example, a general-purpose computer, and has storage 110 and controller 120 as illustrated in FIG. 1.

Storage 110 is a main storage apparatus (not illustrated) such as a read only memory (ROM) or a random access memory (RAM), and/or an auxiliary storage apparatus (not illustrated) such as a hard disk drive (HDD), a solid state drive (SSD), or a flash memory.

Controller 120 is, for example, a hardware processor (not illustrated) such as a central processing unit (CPU), and controls the entire maintenance display apparatus 100 by loading and executing a program stored in storage 110.

Storage 110 and controller 120 may not be configured as an integrated computer. In other words, storage 110 and controller 120 may be configured separately from each other and disposed at distant positions as long as the storage and the controller are configured to be able to communicate with each other. Maintenance display apparatus 100 may have an operator (not illustrated in FIG. 1) and receive an operation input from the outside. Details of storage 110 and controller 120 will be described later.

In the example illustrated in FIG. 1, notifier 130 is included in winding apparatus 200, and is connected to server 10 via network NT. Notifier 130 performs a notification on a user of maintenance display apparatus 100 under the control of controller 120. In the present exemplary embodiment, the user of maintenance display apparatus 100 includes an administrator of maintenance display apparatus 100 or a worker who performs production of a winding body (refer to FIG. 3B described later) by using winding apparatus 200.

As illustrated in FIG. 1, notifier 130 has alarm 131 and display 132. Alarm 131 is configured to issue an alarm to the user with sound, light, or the like by using a buzzer or a lamp. Display 132 is a display device such as a liquid crystal display or an organic EL display, and has a configuration of displaying a warning content. In addition to alarm 131 and display 132, notifier 130 may include, for example, a transmitter that transmits a mail including a warning content to a pre-registered user's mail address.

In the present exemplary embodiment, winding apparatus 200 is an apparatus winding a positive electrode sheet and a negative electrode sheet to produce a lithium ion secondary battery. As illustrated in FIG. 1, winding apparatus 200 has winder 201 and inspection machine 207. As details will be described later, winder 201 winds a positive electrode sheet and a negative electrode sheet to produce a winding body. Inspection machine 207 inspects the winding body produced by winder 201.

In the example illustrated in FIG. 1, notifier 130 is included in winding apparatus 200, but the present disclosure is not limited thereto, and notifier 130 may be installed outside winding apparatus 200. In the example illustrated in FIG. 1, notifier 130 is connected to server 10 via network NT, but the present disclosure is not limited thereto, and server 10 and notifier 130 may be directly connected to each other without using network NT.

In the present exemplary embodiment, a case where winding apparatus 200 is a winding apparatus winding a positive electrode sheet and a negative electrode sheet of a lithium ion secondary battery will be described, but the present disclosure is not limited thereto. The maintenance display apparatus of the present disclosure may be applied to production facilities other than the winding apparatus for a lithium ion secondary battery. The maintenance display apparatus of the present disclosure may be applied to various facilities other than the production facility.

FIG. 2 is a flowchart for describing all process steps in maintenance display apparatus 100.

In step S1, controller 120 causes winder 201 of winding apparatus 200 to produce a winding body.

In step S2, controller 120 causes inspection machine 207 to inspect the produced winding body. Details of the inspection of the winding body in inspection machine 207 will be described later.

In step S3, controller 120 stores the inspection result from inspection machine 207 into storage 110. Simultaneously, in step S4, controller 120 determines whether or not the winding body is a defective product as a result of the inspection in inspection machine 207. In a case where it is determined that the winding body is not a defective product (step S4: NO), controller 120 causes the process to proceed to step S5. In a case where it is determined that the winding body is a defective product (step S4: YES), controller 120 causes the process to proceed to step S6.

In a case where it is determined that the winding body is not a defective product, in step S5, controller 120 causes winding apparatus 200 to supply the winding body to the next step.

In a case where it is determined that the winding body is a defective product, in step S6, controller 120 causes notifier 130 to perform a notification that the defective product has been detected. Details of the notification performed by notifier 130 will be described later.

In step S7, controller 120 causes winding apparatus 200 to discard the winding body determined as being a defective product.

In steps S5 and S7 of the flowchart illustrated in FIG. 2, controller 120 causes winding apparatus 200 to supply the winding body to the next step or to discard the winding body, but the present disclosure is not limited thereto. For example, a user of maintenance display apparatus 100 may be caused to supply the winding body to the next by being notified via notifier 130 such that the winding body is to be supplied to the next step or the winding body to be is discarded.

Next, winder 201 and inspection machine 207 of winding apparatus 200 will be described in detail.

Winder 201

Figure 3A:
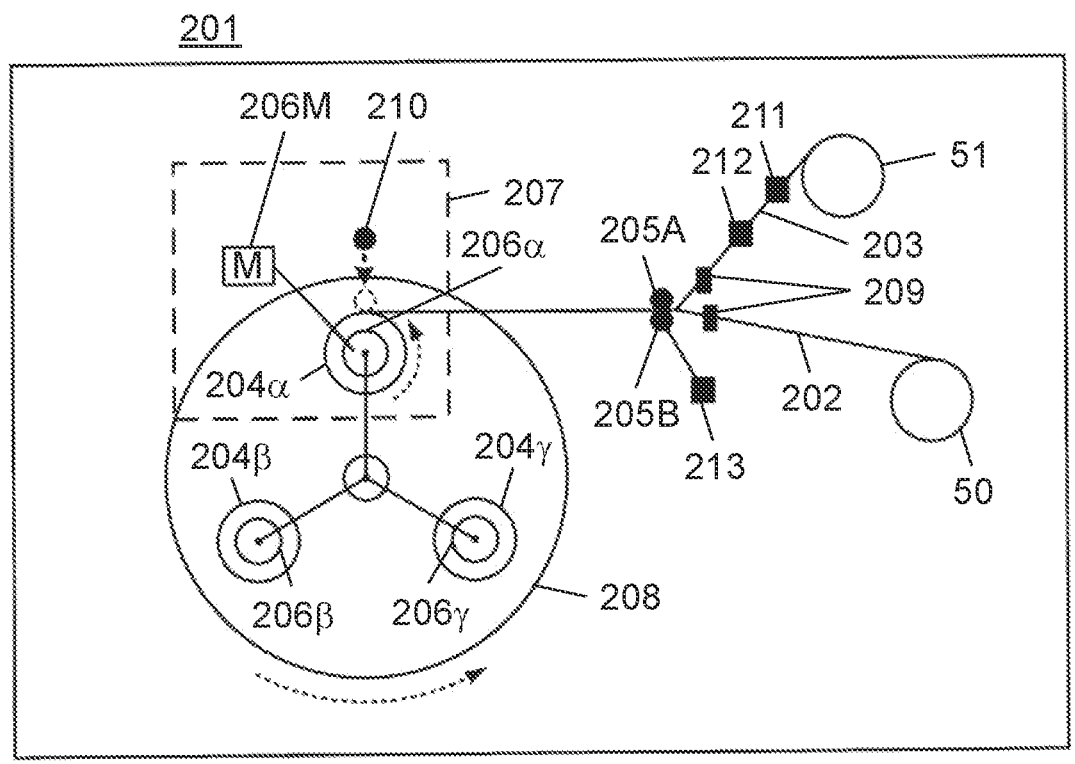
FIG. 3A is a diagram exemplifying a configuration of a winder that produces a winding body in the winding apparatus.

FIG. 3A is a diagram exemplifying a configuration of winder 201.

As illustrated in FIG. 3A, winder 201 includes first supply reel 50, second supply reel 51, first bonding roller 205A, second bonding roller 205B, winding core 206 (206α, 206β, and 206γ), winding core rotation driver 206M, index table 208, cutters 209, presser 210, tab welder 211, tape paster 212, and cylinder 213. Winder 201 is a device that bonds first sheet material 202 supplied from first supply reel 50 to second sheet material 203 supplied from second supply reel 51 with first bonding roller 205A and second bonding roller 205B, and produces winding body 204 by winding the sheet materials on winding core 206. Winding core rotation driver 206M drives winding core 206 at a desired rotation speed.

First sheet material 202 is, for example, a sheet-shaped member (positive electrode sheet) coated with a positive electrode material, and second sheet material 203 is, for example, a sheet-shaped member (negative electrode sheet) coated with a negative electrode material. First sheet material 202 is an example of a first electrode sheet of the present disclosure, and second sheet material 203 is an example of a second electrode sheet of the present disclosure. In the above-described example, first sheet material 202 is a positive electrode sheet material and second sheet material 203 is a negative electrode sheet material, but the present disclosure is not limited thereto, and first sheet material 202 may be a negative electrode sheet material, and second sheet material 203 may be a positive electrode sheet material.

In the example illustrated in FIG. 3A, index table 208 holds three winding cores 206α, 206β, and 206γ. Any one of these three winding cores 206α, 206β, and 206γ is an example of a second winding core of the present disclosure, and the others are examples of first winding cores of the present disclosure. In the following description, three winding cores 206α, 206β, and 206γ will be collectively referred to as winding core 206 in some cases.

Index table 208 rotates each of winding cores 206 along a circular orbit while rotating the winding cores stepwise at predetermined angles. Consequently, one of three winding cores 206 is disposed at a winding position. The winding position is a position where winding core 206 can be rotated by winding core rotation driver 206M. In the example illustrated in FIG. 3A, winding core 206α is disposed at the winding position. When the winding for one winding core 206 is completed, index table 208 sequentially switches the winding core to next winding core 206. In the following description, a winding body wound on winding core 206α will be referred to as winding body 204α, a winding body wound on winding core 206β will be referred to as winding body 204β, and a winding body wound on winding core 206γ will be referred to as winding body 204γ. In the following description, three winding bodies 204α, 204β, and 204γ will be collectively referred to as winding body 204 in some cases.

In the example illustrated in FIG. 3A, the configuration in which index table 208 sequentially switches the three winding cores is described, but the present disclosure is not limited thereto, and the number of winding cores 206 held by index table 208 may be two or more.

Cutters 209 cut first sheet material 202 and second sheet material 203 when the winding on one winding core 206 is completed. In this case, presser 210 presses winding body 204 wound on winding core 206, and thus suppresses the fluttering of ends of the cut first sheet material 202 and second sheet material 203. In the example illustrated in FIG. 3A, cutters 209 are disposed at positions where first sheet material 202 and second sheet material 203 are cut before being bonded to each other, but may be disposed at positions where first sheet material 202 and second sheet material 203 are cut after being bonded to each other.

Tab welder 211 welds a current collecting tab to first sheet material 202. Tape paster 212 fixes winding body 204 with a tape such that winding body 204 is not separated when being cut by cutters 209 after the winding on winding core 206 is completed. Cylinder 213 adjusts a tension applied to first sheet material 202 and second sheet material 203 via second bonding roller 205B.

Figure 3B:
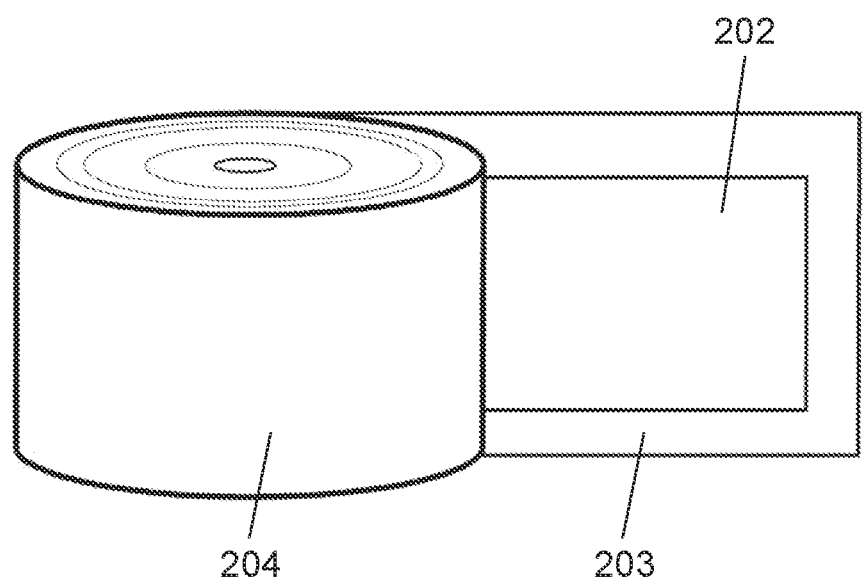
FIG. 3B is a perspective view exemplifying a winding body produced in the winder.

FIG. 3B is a perspective view exemplifying winding body 204 produced in winder 201. FIG. 3B illustrates a scene in which ends (ends cut by cutters 209) of first sheet material 202 and second sheet material 203 forming winding body 204 are not wound. As illustrated in FIG. 3B, a width (a length of winding body 204 along an axial direction) of second sheet material 203 is larger than that of first sheet material 202.

Inspection Machine 207

Inspection machine 207 inspects produced winding body 204. Inspection machine 207 is, for example, a swept source-optical coherence tomography (SS-OCT) device. Inspection machine 207 is an example of a sensor of the present disclosure.

Figure 4A:
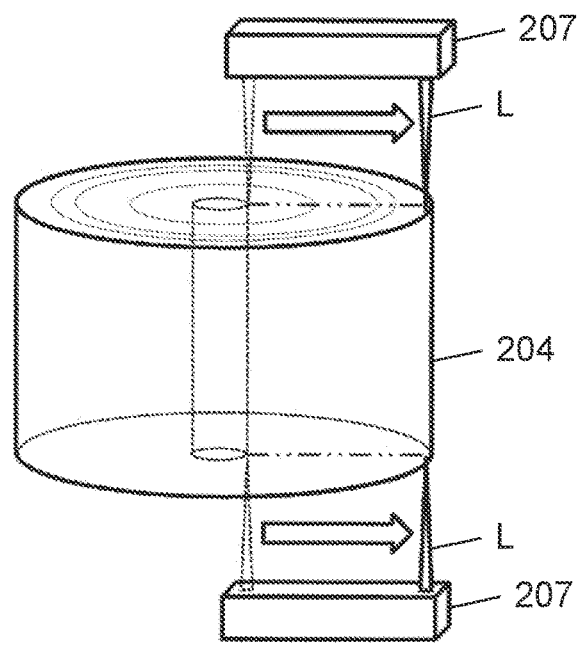
FIG. 4A is a schematic diagram exemplifying a scene in which an inspection machine inspects a winding body.

FIG. 4A is a schematic diagram exemplifying a scene in which inspection machine 207 inspects winding body 204. As illustrated in FIG. 4A, inspection machine 207 scans inspection target winding body 204 with light L by moving light L from the inside to the outside of winding body 204 in the radial direction, and generates an image indicating a shape of an internal structure of winding body 204 by using the interference of light L.

Figure 4B:
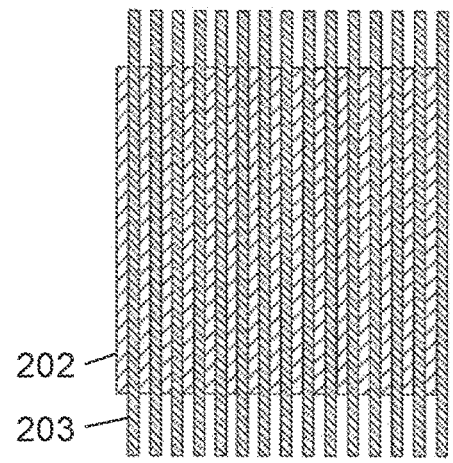
FIG. 4B is a schematic diagram exemplifying a sectional shape of the winding body along a radial direction.
Figure 4C:
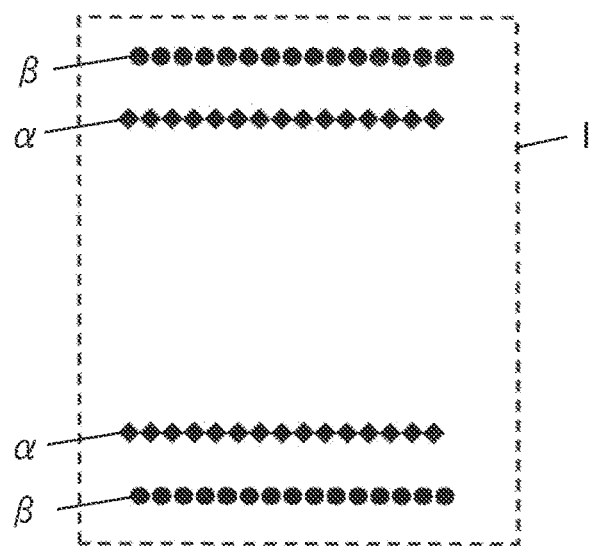
FIG. 4C is a diagram exemplifying an image generated by the inspection machine scanning a section of the winding body illustrated in FIG. 4B.

FIG. 4B is a schematic diagram exemplifying a sectional shape of winding body 204 along the radial direction. FIG. 4C is a diagram exemplifying image I generated by inspection machine 207 scanning the section of winding body 204 illustrated in FIG. 4B. In FIGS. 4B and 4C, an upward-downward direction corresponds to the axial direction of winding body 204, and a leftward-rightward direction corresponds to the radial direction of winding body 204.

As illustrated in FIG. 4B, in the section of winding body 204 along the radial direction, first sheet material 202 and second sheet material 203 having a width larger than that of first sheet material 202 are alternately stacked. Inspection machine 207 extracts and images positions of both ends of first sheet material 202 along the axial direction and both ends of second sheet material 203 along the axial direction, in the radial direction of winding body 204. In the example (image I) illustrated in FIG. 4C, rhombus a corresponds to a first sheet material end position data group indicating the positions of both ends of first sheet material 202, and black circle 8 corresponds to a second sheet material end position data group indicating the positions of both ends of second sheet material 203. The first sheet material end position data group is an example of the first group data, the third group data, or the fifth group data of the present disclosure. The second sheet material end position data group is an example of the second group data, the fourth group data, or the sixth group data of the present disclosure.

Defective products may be produced during the production of winding body 204 in winder 201. Defective products may be produced, for example, due to a defect of each constituent of winder 201 described above. As described above, inspection machine 207 generates an image indicating a sectional shape of winding body 204 along the radial direction, and stores the image as shape data into storage 110. Similarly, the result of the determination of whether or not winding body 204 is defective, which is performed on the basis of the shape data, is also stored in the storage unit 110. The determination of whether or not a winding body is a defective product based on the shape data may be performed by controller 120 illustrated in FIG. 1, may be performed by inspection machine 207, and may be performed by other constituents that are not illustrated in FIG. 1 or 3A. Hereinafter, a description will be made of a case where controller 120 determines whether or not a winding body is a defective product on the basis of shape data.

FIG. 5 is a schematic diagram illustrating examples of a sectional shape and shape data of winding body 204 in a case where winding body 204 wound on certain winding core 206 has a defect. Sectional shapes of winding bodies 204α, 204β, and 204γ respectively wound on winding cores 206α, 206β, and 206γ illustrated in FIG. 3A while index table 208 illustrated in FIG. 3A is rotated once are illustrated on an upper part of FIG. 5. In the example illustrated in FIG. 5, in winding bodies 204α and 204β, heights of both ends of each of first sheet material 202 and second sheet material 203 are aligned, but, in winding body 204γ, heights of both ends of first sheet material 202 and second sheet material 203 are tilted. Index table 208 being rotated once indicates that all of winding cores 206α, 206β, and 206γ are disposed at the winding position and winding body 204 is wound on each winding core 206.

Images Iα, Iβ, and Iγ respectively generated on the basis of the sectional shapes of winding bodies 204α, 204β, and 204γ illustrated on the upper part of FIG. 5 are exemplified on a lower part of FIG. 5. In the following description, images Iα, Iβ, and Iγ corresponding to winding cores 206α, 206β, and 206γ illustrated in FIG. 3A will be collectively referred to as a shape data group. That is, the shape data group is a set of shape data (images) indicating sectional shapes of winding bodies 204α, 204β, and 204γ respectively wound on winding cores 206α, 206β, and 206γ while index table 208 illustrated in FIG. 3A is rotated once. In other words, the shape data group is a set of shape data correlated with plurality of respective winding cores 206.

A correspondence relationship between the winding core and the image in the shape data group will be referred to as a data set. For example, data set DSα is a correlation of winding core 206α and image Iα generated on the basis of the shape data of winding body 204α wound on winding core 206α. The shape data group includes data sets DSα, DSβ, and DSγ (refer to FIG. 14 described later).

Reference lines illustrated in FIG. 5 are lines indicating positions at which both ends of each of first sheet material 202 and second sheet material 203 are to be located. As illustrated in FIG. 5, in images Iα and Iβ, continuous positions of both ends of each of first sheet material 202 and second sheet material 203 coincide with the reference lines (parallel to the reference lines), but in image Iγ, continuous positions of both ends of each of first sheet material 202 and second sheet material 203 are tilted with respect to the reference lines.

As in winding bodies 204α and 204β illustrated in FIG. 5, a winding body having a sectional shape in which continuous positions of both ends of each of first sheet material 202 and second sheet material 203 are parallel to the reference lines is determined as being "good" as an inspection result by inspection machine 207. On the other hand, as in winding body 204γ illustrated in FIG. 5, a winding body having a sectional shape in which continuous positions of both ends of each of first sheet material 202 and second sheet material 203 are tilted with respect to the reference lines is determined as being "defective" by inspection machine 207.

As described above, the defect that the continuous positions of both ends of each of first sheet material 202 and second sheet material 203 are tilted with respect to the reference lines may frequently occur in a case where winding core 206 has a defect. The defect of winding core 206 is, for example, a state in which one side of winding core 206 is scraped due to wear or the like. In a case where any of plurality of winding cores 206 has a defect, it is considered that only winding body 204 wound on defective winding core 206 is determined as being defective.

In the example illustrated in FIG. 5, it is determined whether winding body 204 is "good" or "defective" depending on whether or not the continuous positions of both ends of each of first sheet material 202 and second sheet material 203 are parallel to the reference lines. In the present disclosure, more specifically, even in a case where the continuous positions of both ends of each of first sheet material 202 and second sheet material 203 are tilted with respect to the reference lines, the degree of defect may be determined in stages depending on the magnitude of the tilt of the continuous positions. Specifically, for example, in a case where a tilt angle of continuous positions of both ends of each of first sheet material 202 and second sheet material 203 is less than or equal to a predetermined value, winding body 204 may be determined as being "fair", and, in a case where the tilt angle exceeds the predetermined value, winding body 204 may be determined as being "defective". The defect determination method described above is an example, and a defect determination method is not particularly limited in the present disclosure.

Maintenance Display Apparatus 100

Next, a functional configuration and an operation of maintenance display apparatus 100 that displays information regarding maintenance work to be performed on winding apparatus 200 described above will be described in detail. The maintenance work in the present exemplary embodiment is work of appropriately performing adjustment of each constituent or component replacement on winding apparatus 200 such that winding body 204 produced by winding apparatus 200 does not have a defect. In the present disclosure, the maintenance work is a work particularly for maintaining a defect of winding core 206 described above.

The maintenance work is performed by a worker or the like who actually handles winding apparatus 200.

Storage 110

Figure 6:
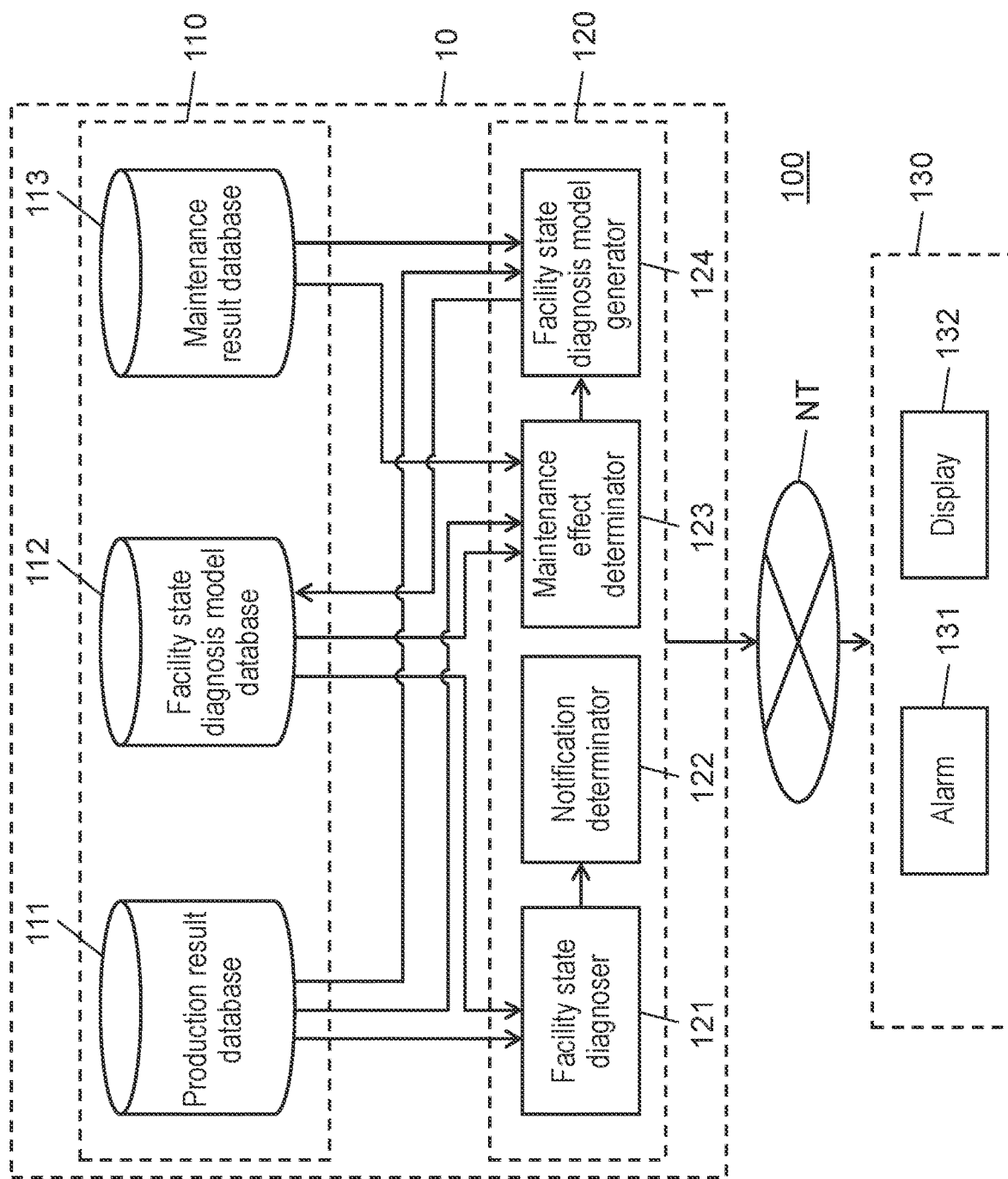
FIG. 6 is a block diagram exemplifying a functional configuration of a maintenance display apparatus according to a first exemplary embodiment.

FIG. 6 is a block diagram exemplifying a functional configuration of maintenance display apparatus 100 according to a first exemplary embodiment. As described above, maintenance display apparatus 100 includes storage 110, controller 120, and notifier 130 (refer to FIG. 1).

As illustrated in FIG. 6, storage 110 has production result database 111, facility state diagnosis model database 112, and maintenance result database 113.

Production result database 111 is a database in which production result data regarding a production result of winding apparatus 200 is registered. The production result data includes the production date and time of produced winding body 204 and shape data of winding body 204.

FIGS. 7A and 7B are diagrams exemplifying production result data PD. FIG. 7A illustrates part of production result data PD in a table form. As illustrated in FIG. 7A, production result data PD includes respective pieces of data such as the "production date and time", a "facility", an "inspection result", a "first sheet material", a "second sheet material", and a "shape data group ID".

The "production date and time" data is data regarding the production date and time at which winding body 204 was produced. The "facility" data is data for identifying a facility that has achieved production results in a case where there are plurality of winding apparatuses 200. In FIG. 7A, as an example, identifiers "A", "B", and "C" of different winding apparatuses 200 are illustrated.

The "inspection result" data is data indicating an inspection result (refer to FIG. 5) of winding body 204 produced in winding apparatus 200. In FIG. 7A, "good" or "defective" is illustrated as an inspection result as an example.

The "first sheet material" data and the "second sheet material" data are data regarding materials used to produce winding body 204. An identifier for identifying each material is stored as the "first sheet material" data and the "second sheet material" data.

The "shape data group ID" is an identification number correlated with a shape data group including data sets DSα, DSβ, and DSγ. FIG. 7B exemplifies a correspondence relationship between the shape data group ID and the shape data.

Among the pieces of production result data PD, each piece of data other than the shape data is registered in production result database 111, for example, automatically or by a worker manually inputting every time winding body 204 is produced in winding apparatus 200. The shape data is generated when produced winding body 204 is inspected by inspection machine 207 (refer to FIG. 1 or FIG. 4A), and is registered in correlation with the shape data ID. In other words, production result data PD substantially includes the shape data of winding body 204. Consequently, every time winding body 204 is produced, production result data PD of the produced winding body 204 is registered in production result database 111.

Facility state diagnosis model database 112 is a database in which plurality of facility state diagnosis models M are registered. Facility state diagnosis model M is a learned model that serves as a diagnosis reference and is used for diagnosing whether or not maintenance work is required for winding apparatus 200. Facility state diagnosis model M is a learned model in which corresponding maintenance work that is effective to a certain defect has been learned in a case where winding apparatus 200 producing a defective product is improved through maintenance work (a production ratio of the defective product is reduced). More specifically, facility state diagnosis model M is an aggregate of data that includes shape data of a winding body including a plurality of defective products and contents of maintenance work performed to improve the defects of the defective products. Facility state diagnosis model M is generated by facility state diagnosis model generator 124 described later.

Facility state diagnosis model M is generated for each piece of maintenance work in which a production ratio of defective products is reduced during the subsequent production of the winding body due to the maintenance work. In other words, for example, facility state diagnosis model M related to maintenance work performed yesterday and facility state diagnosis model M related to maintenance work performed today are independently generated.

A format of facility state diagnosis model M is not particularly limited, but it is desirable that a machine learning model such as a neural network model is employed in order to further improve the diagnosis accuracy. Selection of a model employed in facility state diagnosis model M may be performed by a user of maintenance display apparatus 100 via an operator or the like (not illustrated), and may be performed by facility state diagnosis model generator 124.

Maintenance result database 113 is a database in which maintenance result data MD regarding maintenance work actually performed on winding apparatus 200 is registered. Maintenance result data MD includes, for example, facility data for identifying winding apparatus 200, data regarding the date and time at which the maintenance work was performed (maintenance date and time), and data indicating a content of performed maintenance work. For example, in a case of maintenance work that is finished in a short time of several minutes, the maintenance date and time may be the start time or the end time of the maintenance work. In a case where the maintenance work takes a long time, for example, several hours, the maintenance date and time is preferably the central time of the maintenance work. FIG. 8 is a diagram exemplifying maintenance result data MD. Maintenance result data MD is manually input to maintenance display apparatus 100 by a worker or the like who has actually performed maintenance work for winding apparatus 200 via, for example, an operator that is not illustrated in FIG. 1 immediately after the maintenance work is executed.

Controller 120

As illustrated in FIG. 6, controller 120 includes facility state diagnoser 121, notification determinator 122, maintenance effect determinator 123, and facility state diagnosis model generator 124.

Facility state diagnoser 121 diagnoses a state of winding apparatus 200 by using shape data of new winding body 204 that is produced in winding apparatus 200 and facility state diagnosis model M. The diagnosis result is calculated as coincidence C indicating the degree of coincidence between the shape data of produced new winding body 204 and the past shape data included in facility state diagnosis model M. Here, facility state diagnosis model M includes a content of maintenance work and shape data before the time at which the maintenance work is performed. This means that the degree to which a defect of winding body 204 is reduced by performing maintenance work included in facility state diagnosis model M in a case where the defect of winding body 204 having the shape data included in facility state diagnosis model M occurred in the past. In other words, coincidence C between the shape data of produced new winding body 204 and the shape data included in facility state diagnosis model M indicates a probability of a defect of winding body 204 being improved by performing maintenance included in facility state diagnosis model M.

As a method of calculating coincidence C by comparing a plurality of pieces (m) of shape data of produced new winding body 204 with a plurality of pieces (n) of past shape data included in facility state diagnosis model M, pattern matching, or deep learning using feature amounts of a plurality of pieces of dimensionally compressed shape data may be used as appropriate. The coincidence may be calculated on the basis of a distance between vectors obtained from respective pieces of shape data.

Notification determinator 122 determines whether or not to perform a notification of maintenance work for winding apparatus 200 on the basis of coincidence C. Notification determinator 122 determines that a notification that the maintenance work is to be performed will be performed in a case where coincidence C is greater than or equal to a predetermined threshold value, and determines that the notification will not be performed in a case where coincidence C is less than the predetermined threshold value. The notification of the maintenance work includes an alarm for attracting the user's attention, display for performing a notification of a content of a maintenance work that can be expected to be effective by performing the maintenance work, and the like.

Maintenance effect determinator 123 determines whether or not the maintenance work for winding apparatus 200 is effective. Maintenance effect determinator 123 determines whether or not the maintenance work is effective on the basis of, for example, defect ratios before and after maintenance work (a ratio of defective products to a total number of products) or shape data of winding body 204 before and after the maintenance work (refer to FIG. 5).

Facility state diagnosis model generator 124 generates facility state diagnosis model M on the basis of maintenance result data MD determined as being effective and shape data of a defective product produced before the maintenance work is performed. Facility state diagnosis model M generated by facility state diagnosis model generator 124 is registered in facility state diagnosis model database 112 described above.

Overall Flow of Processes in Maintenance Display Apparatus 100

Figure 9:
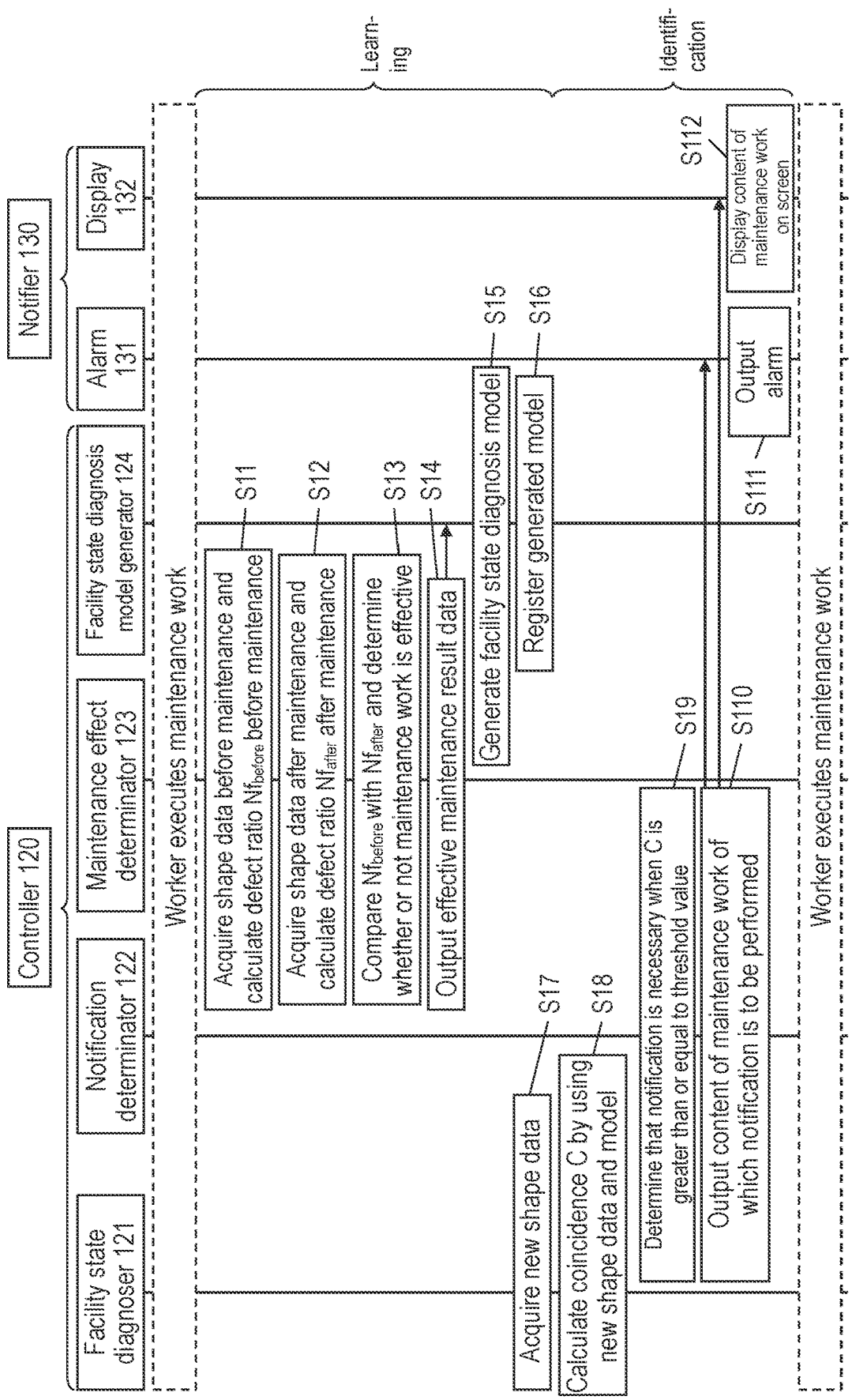
FIG. 9 is a sequence diagram for schematically describing the overall flow of processes in the maintenance display apparatus.
Figure 10:
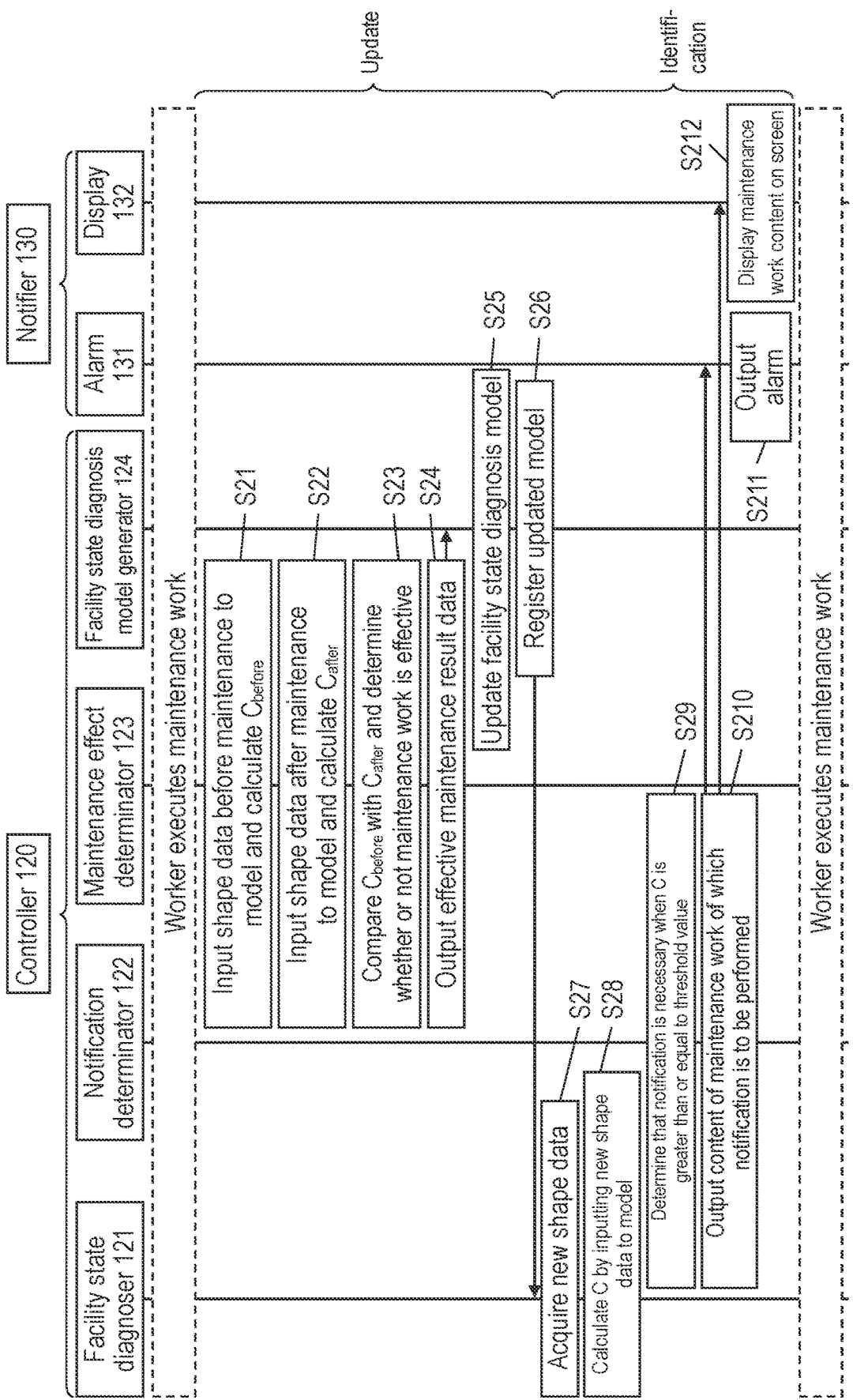
FIG. 10 is a sequence diagram for schematically describing the overall flow of processes in the maintenance display apparatus.

Next, with reference to FIGS. 9 and 10, a description will be made of the overall flow of processes in maintenance display apparatus 100 having the functional configuration illustrated in FIG. 6. FIGS. 9 and 10 are sequence diagrams for schematically describing the overall flow of processes in maintenance display apparatus 100.

FIG. 9 schematically illustrates a learning process in maintenance display apparatus 100 and an identification process using a learned model generated through the learning process.

Learning Process

A learning process in maintenance display apparatus 100 is a process for generating a learned model (facility state diagnosis model M) in which, in a case where a defective product is produced by winding apparatus 200, corresponding maintenance work that improves a defective product related to certain shape data has been learned. Therefore, the learning process presupposes the maintenance work being performed before the start of the learning process.

In step S11, maintenance effect determinator 123 acquires shape data (refer to FIG. 5) included in production result data PD (refer to FIG. 7B) regarding plurality of winding bodies 204 produced before maintenance work performed before the start of the learning process, and calculates defect ratio $Nf_{before}$ before the maintenance work on the basis of the shape data. Defect ratio $Nf_{before}$ is calculated by dividing, for example, the number of winding bodies 204 determined as being defective among winding bodies 204 produced before the maintenance work by a total number of winding bodies produced before the maintenance work.

In step S12, maintenance effect determinator 123 acquires shape data included in production result data PD regarding plurality of winding bodies 204 produced after the maintenance work, and calculates defect ratio $Nf_{after}$ after the maintenance work on the basis of the shape data. Defect ratio $Nf_{after}$ is calculated by dividing, for example, the number of winding bodies 204 determined as being defective among winding bodies 204 produced after the maintenance work by a total number of winding bodies manufactured after the maintenance work.

In step S13, maintenance effect determinator 123 compares defect ratios $Nf_{before}$ and $Nf_{after}$ before and after the maintenance work with each other, and determines whether or not the maintenance work is effective. Details of the process of determining an effect of the maintenance work in maintenance effect determinator 123 in the learning process will be described later.

In a case where it is determined in step S13 that the maintenance work is effective, maintenance effect determinator 123 outputs maintenance result data MD (refer to FIG. 8) indicating a content of the maintenance work performed before the start of the learning process, to facility state diagnosis model generator 124 in step S14.

In step S15, facility state diagnosis model generator 124 generates facility state diagnosis model M by using maintenance result data MD determined as being effective. Details of facility state diagnosis model M will be described later.

In step S16, facility state diagnosis model generator 124 registers generated facility state diagnosis model M into facility state diagnosis model database 112 (refer to FIG. 6).

The processes from step S11 to step S16 described above correspond to the learning process in maintenance display apparatus 100.

Identification Process

The identification process described below is a process to identify whether or not an abnormality or a sign of an abnormality has occurred in winding apparatus 200 based on shape data indicating the sectional shapes of plurality of newly produced winding bodies 204 using facility state diagnosis model M generated in the learning process.

In step S17, facility state diagnoser 121 acquires shape data (hereinafter, new shape data) regarding the plurality of produced new winding bodies.

In step S18, facility state diagnoser 121 calculates coincidence C by using the new shape data and facility state diagnosis model M. Coincidence C is a value indicating the degree of coincidence between the new shape data and the past shape data included in facility state diagnosis model M. In other words, the larger coincidence C, the higher the probability that an abnormality or a sign of an abnormality may have occurred in winding apparatus 200, and thus produced new winding body 204 may become a defective product.

In step S19, notification determinator 122 determines that a notification is necessary for a user of maintenance display apparatus 100 in a case where coincidence C is greater than or equal to a predetermined threshold value. The case where coincidence C is greater than or equal to a predetermined threshold value is a case where an abnormality or a sign of an abnormality has occurred in winding apparatus 200 and maintenance work is required again.

In step S110, notification determinator 122 outputs a content of the maintenance work of which a notification is necessary for the user to notifier 130. The content of the maintenance work of which a notification is necessary for the user is determined on the basis of facility state diagnosis model M in which coincidence C is greater than or equal to a predetermined threshold value.

In steps S111 and S112, notifier 130 notifies the user that the maintenance work is required to be performed. In step S111, alarm 131 issues an alarm. In step S112, display 132 displays the content of the maintenance work of which a notification is necessary for the user. FIG. 9 illustrates an example in which both the alarm in step S111 and the content display of the maintenance work in step S112 are performed, but, for example, the alarm may not be issued and only the content display of the maintenance work may be performed.

As described above, a worker who has received the notification in steps S111 and S112 executes the maintenance work for winding apparatus 200 through the notification on the basis of the content of the maintenance work of which the notification has been performed.

The processes from step S17 to step S112 described above correspond to the identification process in maintenance display apparatus 100 using the learned model generated in the learning process.

FIG. 10 schematically illustrates an update process in maintenance display apparatus 100 and an identification process using a learned model updated in the update process.

Update Process

In an update process in maintenance display apparatus 100, in a case where new maintenance work is performed after the above-described learning process, the learned model (facility state diagnosis model M) is updated on the basis of a maintenance work result based on the maintenance work. In other words, the update process presupposes the maintenance work being performed before the start of the update process.

In step S21, maintenance effect determinator 123 calculates coincidence $C_{before}$ before the maintenance work by using shape data (refer to FIG. 5) included in production result data PD (refer to FIG. 7A) regarding plurality of winding bodies 204 produced before the maintenance work, and facility state diagnosis model M registered in facility state diagnosis model database 112.

In step S22, maintenance effect determinator 123 calculates coincidence $C_{after}$ after the maintenance work by using the shape data included in the production result data regarding plurality of winding bodies 204 produced after the maintenance work, and the past shape data included in facility state diagnosis model M registered in facility state diagnosis model database 112.

In step S23, maintenance effect determinator 123 compares coincidences $C_{before}$ and $C_{after}$ before and after the maintenance work with each other, and thus determines whether or not the maintenance work is effective. Details of the process of determining an effect of the maintenance work in maintenance effect determinator 123 in the update process will be described later.

In a case where it is determined in step S23 that the maintenance work is effective, maintenance effect determinator 123 outputs maintenance result data MD indicating a content of the maintenance work performed before the start of the update process, to facility state diagnosis model generator 124 in step S24.

In step S25, facility state diagnosis model generator 124 updates facility state diagnosis model M by using maintenance result data MD determined as being effective. Details of the process of updating facility state diagnosis model M will be described later.

In step S26, facility state diagnosis model generator 124 updates facility state diagnosis model database 112 (refer to FIG. 6) by using generated facility state diagnosis model M.

The processes from step S21 to step S26 described above correspond to the update process in maintenance display apparatus 100.

Identification Process

In the identification process described below, whether or not an abnormality or a sign of an abnormality has occurred in winding apparatus 200 is identified by using facility state diagnosis model M updated in the update process on the basis of shape data indicating sectional shapes of plurality of produced new winding bodies 204.

In step S27, facility state diagnoser 121 acquires shape data (hereinafter, new shape data) of the plurality of produced new winding bodies.

In step S28, facility state diagnoser 121 calculates coincidence C by using the new shape data and facility state diagnosis model M. Coincidence C is a value indicating the degree of coincidence between the new shape data and the past shape data included in facility state diagnosis model M.

In step S29, notification determinator 122 determines that a notification is necessary for a user of maintenance display apparatus 100 in a case where coincidence C is greater than or equal to a predetermined threshold value. The case where coincidence C is greater than or equal to a predetermined threshold value is a case where an abnormality or a sign of an abnormality has occurred in winding apparatus 200 and maintenance work is required again.

In step S210, notification determinator 122 outputs a content of the maintenance work of which a notification is necessary for the user to notifier 130. The content of the maintenance work of which a notification is necessary for the user is determined on the basis of facility state diagnosis model M in which coincidence C is greater than or equal to a predetermined threshold value.

In steps S211 and S212, notifier 130 notifies the user that the maintenance work is required to be performed. In step S211, alarm 131 issues an alarm. In step S212, display 132 displays the content of the maintenance work of which a notification is necessary for the user. FIG. 10 illustrates an example in which both the alarm in step S211 and the content display of the maintenance work in step S212 are performed, but, for example, the alarm may not be issued and only the content display of the maintenance work may be performed.

A worker who has received the notification in steps S211 and S212 executes the maintenance work for winding apparatus 200 on the basis of the content of the maintenance work of which the notification has been performed.

The processes from step S27 to step S212 described above correspond to the identification process in maintenance display apparatus 100. The identification process from step S27 to step S212 illustrated in FIG. 10 is substantially the same as the identification process from step S17 to step S112 illustrated in FIG. 9.

Details of Each Process

Hereinafter, each of the learning process, the identification process, and the update process illustrated in FIGS. 9 and 10 will be described in detail.

Learning Process

First, the learning process in maintenance effect determinator 123 and facility state diagnosis model generator 124 will be described.

Process in Maintenance Effect Determinator 123

Figure 11:
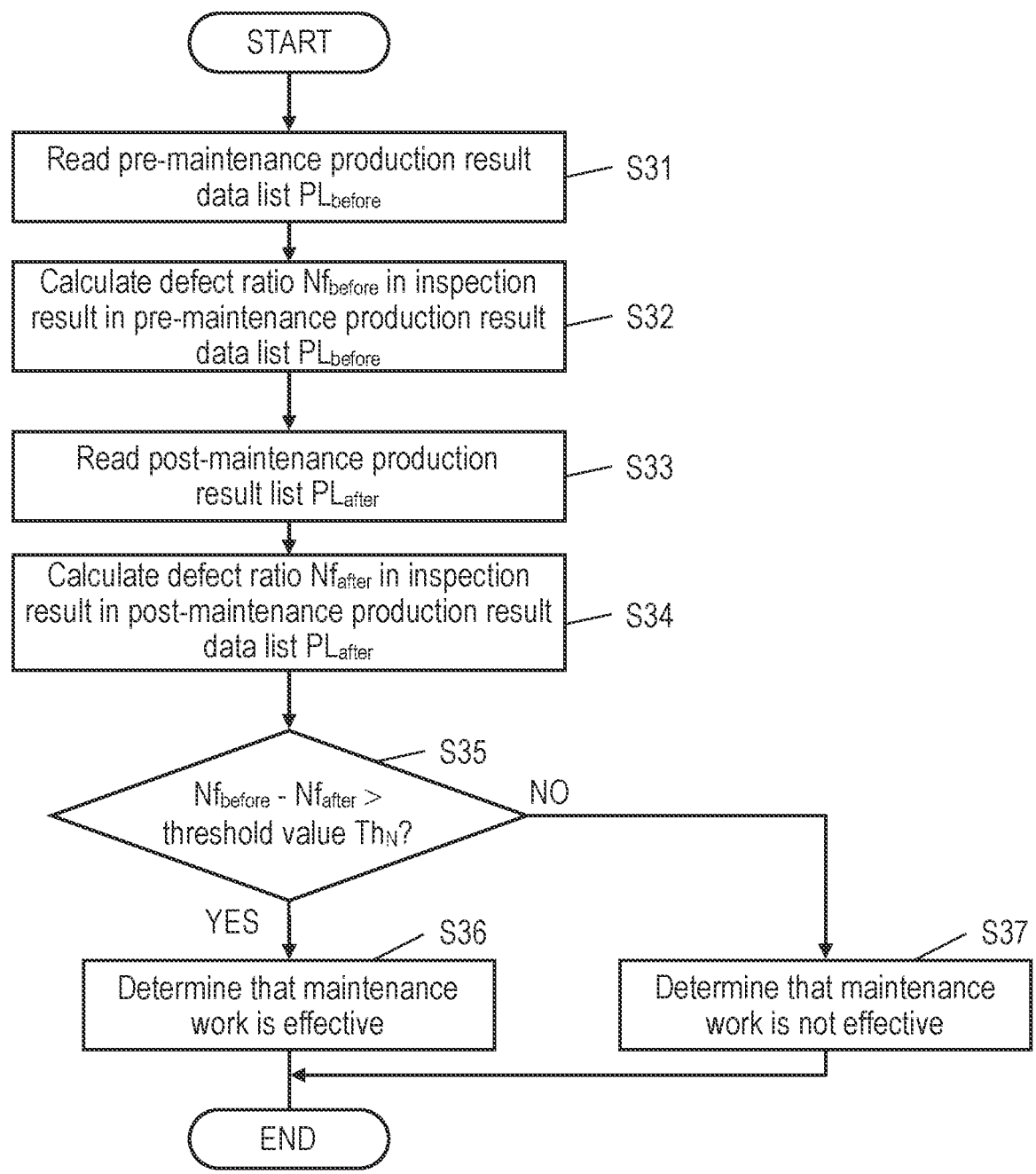
FIG. 11 is a flowchart for describing a process executed by a maintenance effect determinator in a learning process.

Hereinafter, a description will be made of processes (processes from steps S11 to S14 in FIG. 9) executed by maintenance effect determinator 123 in the learning process. FIG. 11 is a flowchart for describing the processes executed by maintenance effect determinator 123 in the learning process.

In step S31, maintenance effect determinator 123 reads, from production result database 111, production result data list $PL_{before}$ including all production result data regarding winding bodies 204 produced within a predetermined time from the time point at which the maintenance work is performed before the learning process among pieces of production result data registered in production result database 111. The predetermined time is a preset length of time and is a time required for manufacturing a certain number or more of winding bodies 204.

In step S32, maintenance effect determinator 123 calculates pre-maintenance defect ratio $Nf_{before}$ on the basis of production result data included in production result data list $PL_{before}$. As described above, pre-maintenance defect ratio $Nf_{before}$ is calculated by dividing the number of winding bodies 204 determined as being defective by a total number of winding bodies produced before the maintenance work on the basis of the shape data and inspection results in the production result data included in production result data list $PL_{before}$.

In step S33, maintenance effect determinator 123 reads, from production result database 111, production result data list $PL_{after}$ including all production result data regarding winding bodies 204 produced until a predetermined time elapses from the time point at which the maintenance is performed.

In step S34, maintenance effect determinator 123 calculates post-maintenance defect ratio $Nf_{after}$ on the basis of the production result data included in production result data list $PL_{after}$. As described above, post-maintenance defect ratio $Nf_{after}$ is calculated by dividing the number of winding bodies 204 determined as being defective by a total number of winding bodies produced after the maintenance work on the basis of the shape data and inspection results in the production result data included in production result data list $PL_{after}$.

In step S35, maintenance effect determinator 123 takes a difference between pre-maintenance defect ratio $Nf_{before}$ and post-maintenance defect ratio $Nf_{after}$, and determines whether or not the difference is greater than predetermined threshold value $Th_N$. Maintenance effect determinator 123 causes the process to proceed to step S36 in a case where the difference is greater than threshold value $Th_N$ (step S35: YES), and causes the process to proceed to step S37 in other cases (step S35: NO).

In step S36, maintenance effect determinator 123 determines that the maintenance work is effective since post-maintenance defect ratio $Nf_{after}$ is lower than pre-maintenance defect ratio $Nf_{before}$. The maintenance work mentioned here is maintenance work performed before the learning process, that is, before step S11 in FIG. 9

On the other hand, in step S37, maintenance effect determinator 123 determines that the maintenance work is not effective or the effect is very small since post-maintenance defect ratio $Nf_{after}$ is not lower than pre-maintenance defect ratio $Nf_{before}$.

In the above-described way, maintenance effect determinator 123 determines whether or not the maintenance work performed before the learning process is effective in the learning process.

Figure 12A:
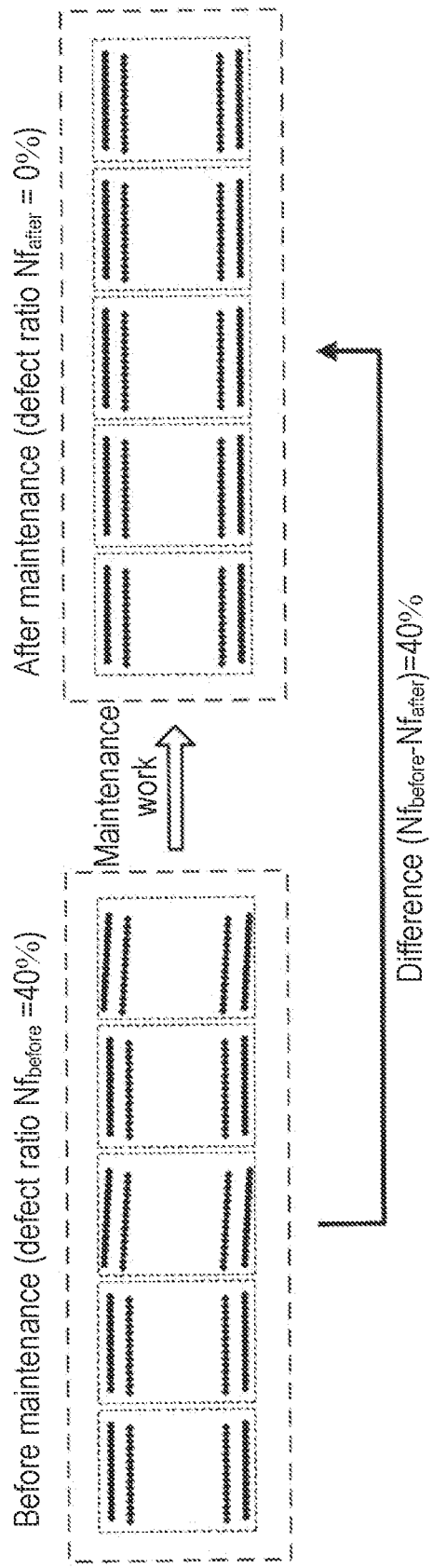
FIG. 12A is a conceptual diagram for describing a scene in which an effect of maintenance work in the learning process is determined.
Figure 12B:
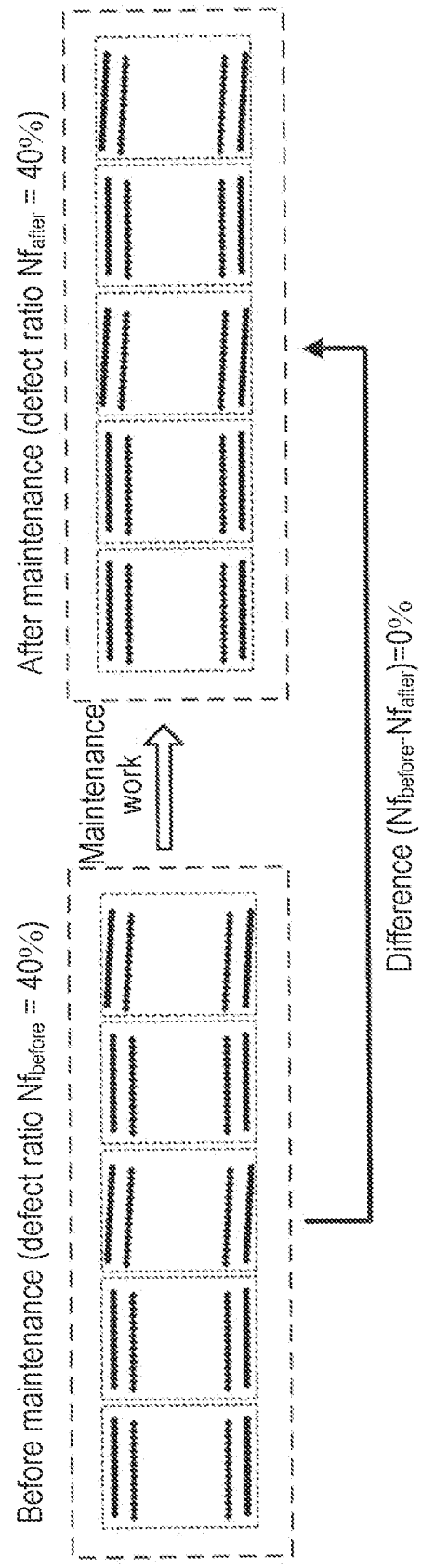
FIG. 12B is a conceptual diagram for describing a scene in which an effect of maintenance work in the learning process is determined.

FIGS. 12A and 12B are conceptual diagrams for describing a scene in which an effect of the maintenance work in the learning process is determined. FIG. 12A illustrates an example of a case where it is determined that the maintenance work is effective, and FIG. 12B illustrates an example of a case where it is determined that the maintenance work is not effective. FIGS. 12A and 12B illustrate five winding bodies wound on one winding core 206 among plurality of winding cores 206.

In the examples illustrated in FIGS. 12A and 12B, two of the five winding bodies wound on one winding core 206 are determined as being defective before maintenance. In other words, pre-maintenance defect ratio $Nf_{before}$ is 40%. In the example illustrated in FIG. 12A, among the five winding bodies wound on one certain winding core 206 after maintenance, the number of winding bodies determined as being defective is 0 (post-maintenance defect ratio $Nf_{after}=0$). On the other hand, in the example illustrated in FIG. 12B, among the five winding bodies wound on one winding core 206 after maintenance, the number of winding bodies determined as being defective is two that is the same as before maintenance (post-maintenance defect ratio $Nf_{after}=40\%$).

Therefore, in the example illustrated in FIG. 12A, a difference between pre-maintenance defect ratio $Nf_{before}$ and post-maintenance defect ratio $Nf_{after}$ is 40%. On the other hand, in the example illustrated in FIG. 12B, a difference between pre-maintenance defect ratio $Nf_{before}$ and post-maintenance defect ratio $Nf_{after}$ is 0. Therefore, for example, in a case where threshold value $Th_N$ for determining the presence or absence of the maintenance effect is 20%, it is determined that the maintenance work is effective in the example illustrated in FIG. 12A, and it is determined that the maintenance work is not effective in the example illustrated in FIG. 12B.

Processes in Facility State Diagnosis Model Generator 124

Figure 13:
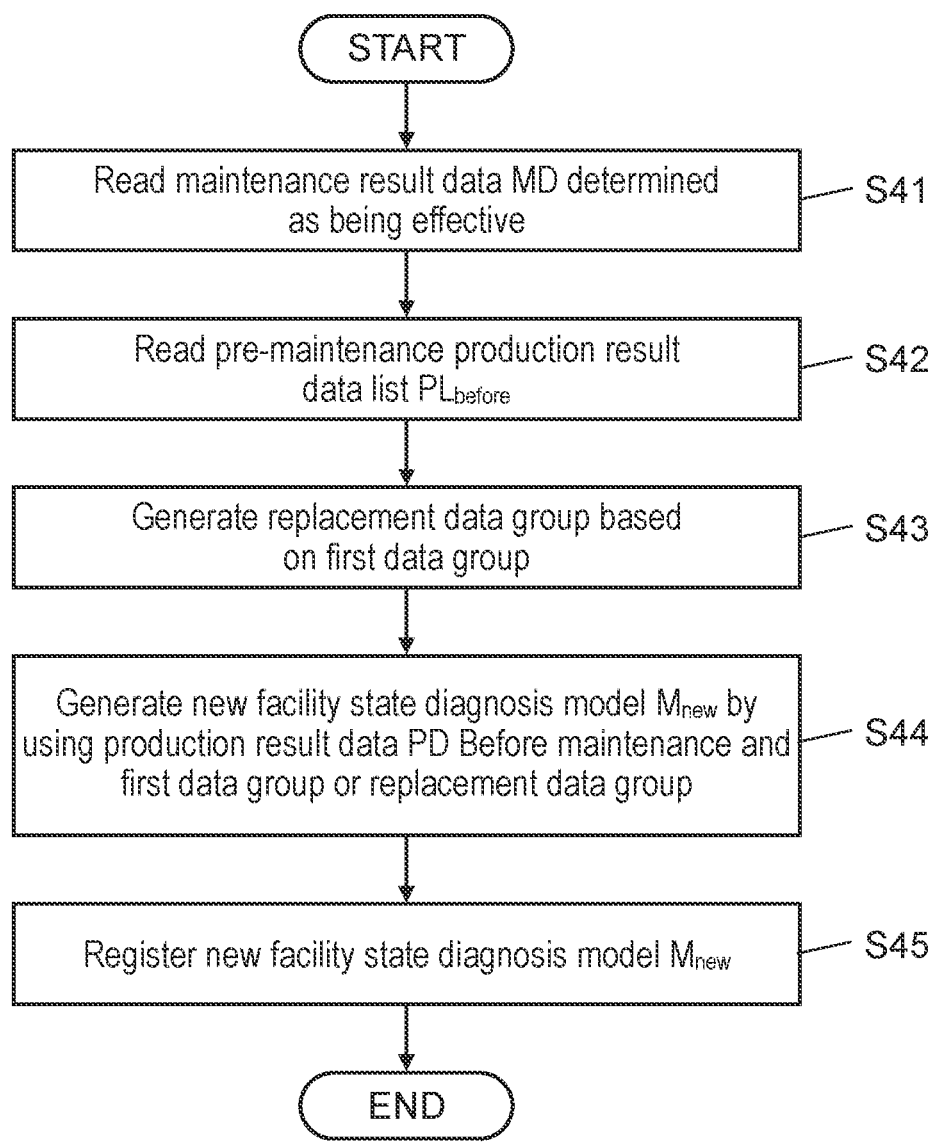
FIG. 13 is a flowchart for describing a process executed by a facility state diagnosis model generator in the learning process.

Next, processes (the processes in steps S15 and S16 in FIG. 9) executed by facility state diagnosis model generator 124 in the learning process will be described. FIG. 13 is a flowchart for describing the processes executed by facility state diagnosis model generator 124 in the learning process.

In step S41, facility state diagnosis model generator 124 reads maintenance result data MD of the maintenance work determined as being effective by maintenance effect determinator 123.

In step S42, facility state diagnosis model generator 124 reads pre-maintenance production result data list $PL_{before}$ from production result database 111. Here, pre-maintenance production result data list $PL_{before}$ read by facility state diagnosis model generator 124 is the same as pre-maintenance production result data list $PL_{before}$ read in the process performed by maintenance effect determinator 123 (refer to step S31 in FIG. 11).

In step S43, facility state diagnosis model generator 124 generates a replacement data group including a replacement data set in which pieces of shape data of a plurality of data sets included in a shape data group are replaced with each other by using the shape data group corresponding to read pre-maintenance production result data list $PL_{before}$. The shape data group corresponding to result data list $PL_{before}$ indicates a shape data group corresponding to a shape data group ID included in the result data list $PL_{before}$. In the following description, the shape data group corresponding to read pre-maintenance production result data list $PL_{before}$ will be referred to as a first data group.

The replacement data group is generated as follows. It is assumed that the first data group includes data set DSα indicating a correspondence relationship between winding core 206α and image Iα, data set DSβ indicating a correspondence relationship between winding core 206β and image Iβ, and data set DSγ indicating a correspondence relationship between winding core 206γ and image Iγ. It is assumed that image Iγ indicates a defect of winding body 204γ.

In this case, the replacement data set is generated by replacing the correspondence relationship between the winding core and the shape data among the plurality of data sets.

Figure 14:
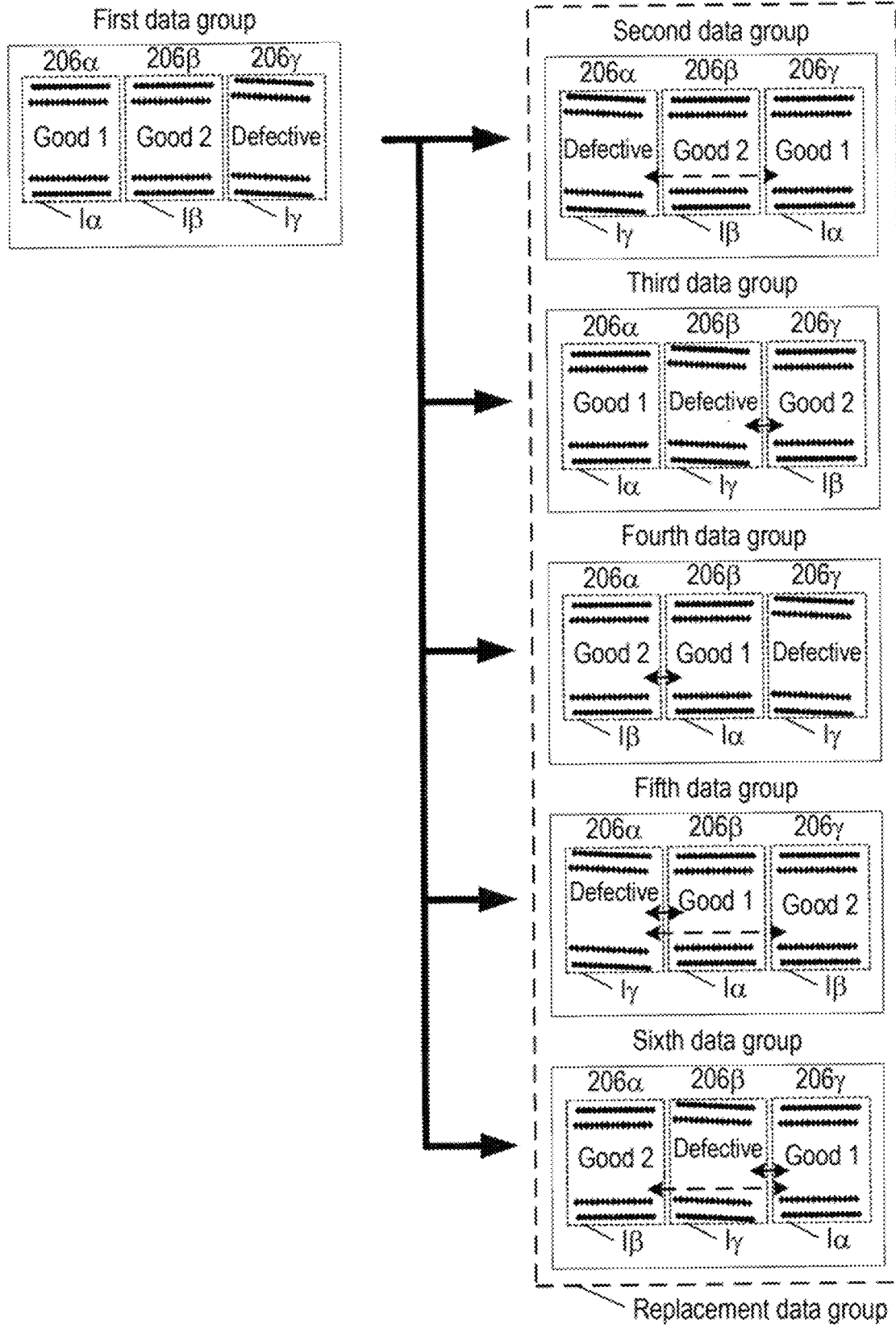
FIG. 14 is a diagram for describing a replacement data group.

A specific example will be described. FIG. 14 is a diagram for describing a replacement data group. FIG. 14 illustrates a scene in which five replacement data groups from a second data group to a sixth data group are generated on the basis of the first data group. The first data group illustrated in FIG. 14 is the same as the shape data group illustrated on the lower part of FIG. 5. In the first data group, image Iα and image Iβ indicate "good" and image Iγ indicates "defective". In FIG. 14, in order to distinguish between image Iα and image Iβ, image Iα is illustrated as "good 1" and image Iβ is illustrated as "good 2".

The second data group is a group in which images Iα and Iγ are replaced with each other in data sets DSα and DSγ included in the first data group. That is, in the second data group, image Iα of data set DSα is replaced with image Iγ, and image Iγ of data set DSγ is replaced with image Iα.

In the following description, data sets generated on the basis of data sets DSx and DSy will be referred to as a replacement data sets, and are indicated by DSxy and DSyx. Note that x and y are any of α, β and γ, and x≠y. Replacement data set DSxy indicates that winding core 206x is correlated with image Iy, and replacement data set DSyx indicates that winding core 206y is correlated with image Ix.

As described above, the second data group includes replacement data set DSαγ in which winding core 206α is correlated with image Iγ indicating "defective", and replacement data set DSγα in which winding core 206γ is correlated with image Iα indicating "good 1". In the second data group, replacement is not performed on data set DSβ.

The third data group is a group in which images Iβ and Iγ are replaced with each other in data sets DSβ and DSγ included in the first data group. That is, the third data group includes replacement data set DSβγ in which winding core 206β is correlated with image Iγ indicating "defective" and replacement data set DSγβ in which winding core 206γ is correlated with image Iβ indicating "good 2". In the third data group, replacement is not performed on data set DSα.

The fourth data group is a group in which images Iα and Iβ are replaced with each other in data sets DSα and DSβ included in the first data group. That is, the fourth data group includes replacement data set DSαβ in which winding core 206α is correlated with image Iβ indicating "good 2" and replacement data set DSβα in which winding core 206β is correlated with image Iα indicating "good 1". In the third data group, replacement is not performed on data set DSγ.

The fifth data group is a group in which images Iα and Iβ are replaced with each other in data sets DSα and DSβ included in the first data group, and then images Iα and Iγ are replaced with each other in replacement data set DSαβ and data set DSγ. That is, the fifth data group includes replacement data set DSαγ in which winding core 206α is correlated with image Iγ indicating "defective", replacement data set DSβα in which winding core 206β is correlated with image Iα indicating "good 1", and replacement data set DSγβ in which winding core 206γ is correlated with image Iβ indicating "good 2".

The sixth data group is a group in which images Iβ and Iγ are replaced with each other in data sets DSβ and DSγ included in the first data group, and then images Iγ and Iα are replaced with each other in replacement data set DSγβ and data set DSα. That is, the sixth data group includes replacement data set DSαβ in which winding core 206α is correlated with image Iβ indicating "good 2", replacement data set DSβγ in which winding core 206β is correlated with image Iγ indicating "defective", and replacement data set DSγα in which winding core 206γ is correlated with image Iα indicating "good 1".

In the above-described way, the replacement data group is generated by replacing images with each other among the data sets included in the original data group.

As described above, in step S43, facility state diagnosis model generator 124 uses the first data group corresponding to read pre-maintenance production result data list $PL_{before}$ to generate a replacement data group in which combinations of plurality of winding cores 206 and the shape data (images) are replaced with each other. Consequently, shape data groups are generated by all combinations of plurality of winding cores 206 and the shape data (images).

In step S44, facility state diagnosis model generator 124 generates new facility state diagnosis model $M_{new}$ by using read maintenance result data MD, and one of the first data group and the replacement data group.

Facility state diagnosis model $M_{new}$ generated in above-described way is used as a plurality of learned models indicating that each winding core 206 corresponding to the image indicating "defective" in the shape data group used for generation is a cause of the defect.

A specific example will be described. As illustrated in FIG. 14, facility state diagnosis model $M_{new}$ generated by using the first data group (image Iγ indicates "defective") not undergoing replacement is a learned model indicating that winding core 206γ is a cause of a defect. As mentioned above, a learned model generated by using the first data group including data set DSγ in which the shape data (image Iγ) of winding body 204γ in which a defect actually occurs is correlated with winding core 206γ which is a cause of the defect will be hereinafter referred to as a first facility state diagnosis model.

As in the second to sixth data groups illustrated in FIG. 14, a learned model generated by using replacement data set DSαγ or DSβγ in which winding core 206α or 206β on which winding body 204α or 204β in which a defect does not actually occur is wound is correlated with the shape data (image Iγ) indicating the occurrence of the defect will be hereinafter referred to as a second facility state diagnosis model.

Facility state diagnosis model $M_{new}$ generated by using the first data group (data set DSγ in which image Iγ is correlated with winding core 206γ) illustrated in FIG. 14 is a first learned model indicating that winding core 206γ is a cause of a defect. Similarly, facility state diagnosis model $M_{new}$ generated by using the fourth data group (data set DSγ in which image Iγ is correlated with winding core 206γ) illustrated in FIG. 14 is a first learned model indicating that winding core 206γ is the cause of a defect.

On the other hand, facility state diagnosis model $M_{new}$ generated by using the second data group (including data set DSαγ in which image Iγ is correlated with winding core 206α) illustrated in FIG. 14 is a second learned model indicating that winding core 206α is a cause of a defect. Facility state diagnosis model $M_{new}$ generated by using the third data group (including data set DSβγ in which image Iγ is correlated with winding core 206β) illustrated in FIG. 14 is the second learned model indicating that winding core 206β is a cause of a defect. Facility state diagnosis model $M_{new}$ generated by using the fifth data group (image Iγ is correlated with winding core 206α) illustrated in FIG. 14 is the second learned model indicating that winding core 206α is a cause of a defect. Facility state diagnosis model $M_{new}$ generated by using the sixth data group (image Iγ is correlated with winding core 206β) illustrated in FIG. 14 is the second learned model indicating that winding core 206β is a cause of a defect.

As described above, in step S44, facility state diagnosis model generator 124 generates the first facility state diagnosis model indicating that a cause of a defect is a winding core 206γ by using the first data group including data set DSγ indicating that the defect actually occurs in winding body 204γ. At the same time, facility state diagnosis model generator 124 also generates the second facility state diagnosis model indicating that a cause of a defect is winding core 206α or 206β by using a replacement data group (second to sixth data groups) including a replacement data set in a case of assuming that winding body 204α or 204β has the defect. Through the process, many learned models can be generated by using a small amount of training data (an image indicating a defect).

In step S45, facility state diagnosis model generator 124 registers all of generated new facility state diagnosis model $M_{new}$ into facility state diagnosis model database 112.

As mentioned above, in the learning process, new facility state diagnosis model $M_{new}$ in which corresponding maintenance work improving a defective product having related shape data has been learned is generated, and is registered into facility state diagnosis model database 112.

In the learning process, when a shape data group in which a winding body wound on one of plurality of winding cores 206 actually has a defect is acquired, a replacement data group including a replacement data set in a case of assuming that a winding body wound on another winding core has a defect is generated. Facility state diagnosis model $M_{new}$ indicating that a cause of the defect is the winding body is generated by using the shape data group in which the winding body wound on the winding core among plurality of winding cores 206 actually has the defect, and facility state diagnosis model $M_{new}$ indicating that a cause of a defect is a winding core corresponding to another winding body in a case where another winding body has the defect is also generated by using the replacement data group.

Hereinafter, a description will be made of a specific example of a flow of a learning process in a case where the first data group including image Iγ indicating that winding body 204γ has a defect is acquired. Here, winding body 204γ having a defect is an example of a second winding body of the present disclosure, and winding core 206γ is an example of a second winding core of the present disclosure. The shape data used to generate image Iγ is an example of third group data and fourth group data of the present disclosure. On the other hand, winding body 204α or 204β having no defect is an example of a first winding body of the present disclosure, and winding core 206α or 206β is an example of a first winding core of the present disclosure. The first sheet position data group (refer to FIG. 4C) in image Iα or Iβ is an example of the first group data of the present disclosure. The second sheet position data group in image Iα or Iβ is an example of the second group data.

Through the above learning process, facility state diagnosis model generator 124 generates the first facility state diagnosis model indicating that winding core 206γ is a cause of a defect by using the first data group or the fourth data group including data set DSγ indicating the correspondence relationship between winding core 206γ and image Iγ.

Through the learning process, facility state diagnosis model generator 124 generates the second facility state diagnosis model for determining that winding core 206α or 206β is a cause of a defect in a case of assuming that a new shape data group including shape data of winding body 204α or 204β having the defect is acquired, by using a replacement data group (the second, third, fifth, and sixth data groups) including a replacement data set in which the images are replaced with each other among the data sets included in the first data group. In this case, new winding body 204α or 204β having the defect, which is assumed to be acquired, is an example of a third winding body of the present disclosure. Then, the first sheet position data group (refer to FIG. 4C) in image Iα or Iβ of new winding body 204α or 204β having the defect, which is assumed to be acquired, is an example of a fifth group data of the present disclosure. The second sheet position data group in image Iα or Iβ of new winding body 204α or 204β having the defect, which is assumed to be acquired, is an example of a sixth group data of the present disclosure.

Data set DSα in which winding core 206α and image Iα are correlated with each other and data set DSβ in which winding core 206β and image Iβ are correlated with each other, which are included in the first data group, are an example of a first data set of the present disclosure. Data set DSγ in which winding core 206γ and image Iγ are correlated with each other is an example of a second data set of the present disclosure.

Among replacement data sets, included in a replacement data group, in which images Iα and Iγ are replaced with each other between data sets DSα and DSγ, replacement data set DSαγ in which winding core 206α and image Iγ are correlated with each other is an example of a first replacement data set of the present disclosure. Similarly, among replacement data sets in which images Iβ and Iγ are replaced with each other between data sets DSβ and DSγ, replacement data set DSβγ in which winding core 206B and image Iγ are correlated with each other is an example of the first replacement data set of the present disclosure. Among replacement data sets in which images Iα and Iγ are replaced with each other between data sets DSα and DSγ, replacement data set DSαγ in which winding core 206γ and image Iα are correlated with each other is an example of a second replacement data set of the present disclosure. Similarly, among replacement data sets in which images Iβ and Iγ are replaced with each other between data sets DSβ and DSγ, replacement data set DSγβ in which winding core 206γ and image Iβ are correlated with each other is an example of the second replacement data set of the present disclosure.

In the above learning process, facility state diagnosis model generator 124 generates the first facility state diagnosis model by using the first and fourth data groups including the second data set, and generates the second facility state diagnosis model by using the second, third, fifth, and sixth data groups including the replacement data set.

The following effects can be achieved by such a learning process of the present disclosure. In a case where a production ratio of defective products in winding apparatus 200 is low, it may be difficult to collect enough training data to generate facility state diagnosis model M for accurately determining a cause of a defect. Even in such a case, according to the learning process of the present disclosure, a plurality of replacement data groups are generated by using a shape data group including shape data indicating a defect, and can be used as training data to generate facility state diagnosis model M. Consequently, facility state diagnosis model M in a case where all of plurality of winding cores 206 are causes of defects can be generated by using only a shape data group in which any of plurality of winding cores 206 is a cause of a defect.

According to the method of generating facility state diagnosis model M, training data for generating facility state diagnosis model M can be apparently increased, and thus a large number of facility state diagnosis models M can be generated. As a result, a special effect can be obtained in which the diagnosis accuracy of a cause of a defect using facility state diagnosis model M in the subsequent identification process can be easily improved. As illustrated in FIG. 14, in a case where there are a plurality of pieces of shape data indicating "good", the pieces of shape data indicating "good" are distinguished from each other, and thus the number of shape data groups serving as training data can be further increased compared with a case where the pieces of shape data indicating "good" are not distinguished from each other.

Identification Process

Next, the identification process performed by facility state diagnoser 121 and notification determinator 122 will be described.

Processes in Facility State Diagnoser 121

Figure 15:
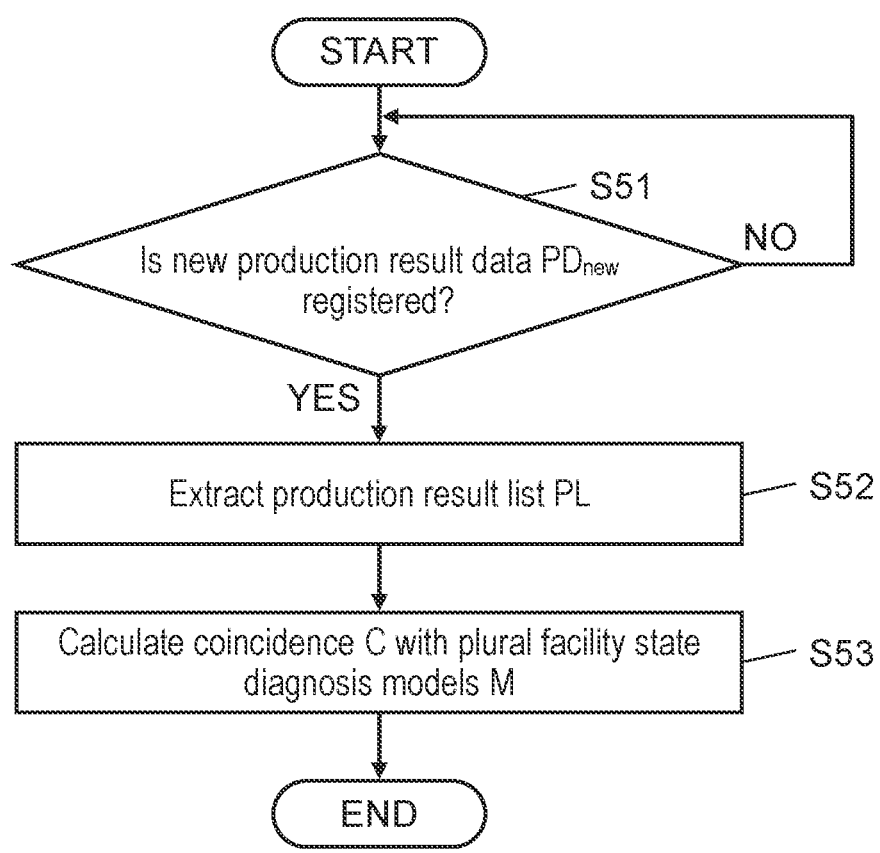
FIG. 15 is a flowchart for describing a process executed by a facility state diagnoser in an identification process.

Hereinafter, the processes (processes in step S17 and step S18 in FIG. 9) executed by facility state diagnoser 121 in the identification process will be described. FIG. 15 is a flowchart for describing the processes executed by facility state diagnoser 121 in the identification process.

In step S51, facility state diagnoser 121 determines whether or not new production result data $PD_{new}$ is registered in production result database 111. In a case where new production result data $PD_{new}$ is not registered (step S51: NO), facility state diagnoser 121 repeatedly executes step S51. In a case where new production result data $PD_{new}$ is registered (step S51: YES), facility state diagnoser 121 causes the process to proceed to step S52.

In step S52, facility state diagnoser 121 extracts production result data list PL from production result database 111 on the basis of registered new production result data $PD_{new}$. Production result data list PL is a list obtained by extracting production result data PD of winding bodies 204 produced within a predetermined time from the production date and time of registered new production result data $PD_{new}$ among pieces of production result data PD registered in production result database 111. In other words, at least registered new production result data $PD_{new}$ is included in production result data list PL.

In step S53, facility state diagnoser 121 generates coincidence C by using the shape data included in registered new production result data list PL and the past shape data included in facility state diagnosis model M read from facility state diagnosis model database 112. The facility state diagnosis model used here is one of a plurality of facility state diagnosis models including the first facility state diagnosis model and the second facility state diagnosis model generated through the above-described learning process.

More specifically, facility state diagnoser 121 extracts respective pieces of shape data (refer to FIG. 5) from one or more pieces of production result data included in production result data list PL. On the other hand, facility state diagnoser 121 extracts plurality of facility state diagnosis models M registered in facility state diagnosis model database 112. The plurality of facility state diagnosis models M correspond to different causes of defects and also correspond to different pieces of maintenance work.

Facility state diagnoser 121 calculates plurality of coincidences C in all combinations of shape data extracted from the one or more pieces of production result data and plurality of facility state diagnosis models M.

Processes in Notification Determinator 122

Figure 16:
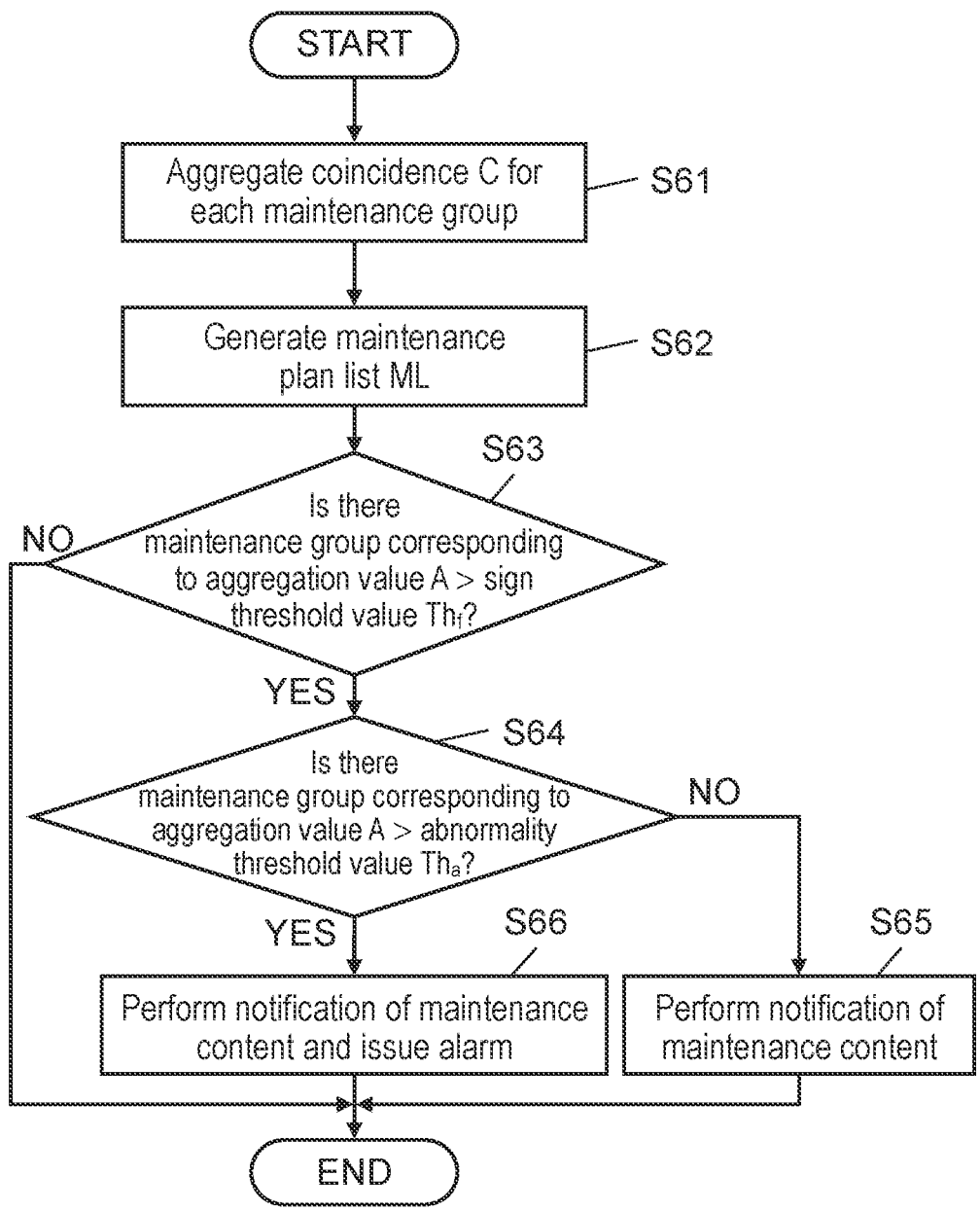
FIG. 16 is a flowchart for describing a process executed by a notification determinator in the identification process.

Hereinafter, a description will be made of processes (processes from step S19 to step S112 in FIG. 9) executed by notification determinator 122 in the identification process. FIG. 16 is a flowchart for describing the processes executed by notification determinator 122 in the identification process.

In step S61, notification determinator 122 aggregates coincidence C for each maintenance group on the basis of plurality of coincidences C generated by facility state diagnoser 121. The maintenance group is a group corresponding to a content of maintenance work. For example, notification determinator 122 groups the performed maintenance work on the basis of the maintenance group information illustrated in FIG. 17A. As illustrated in FIG. 17A, the maintenance group information is information in which a maintenance group is correlated with performed maintenance work included in the maintenance group. As illustrated in FIG. 17A, the maintenance group information may further include a maintenance plan to be performed corresponding to a maintenance group. In the present exemplary embodiment, a group divided for each member that is a maintenance work target is described as a maintenance group, but the present disclosure is not limited thereto, and the maintenance group may be, for example, a group divided for each content of maintenance work or for each component number of a component to be replaced in maintenance work.

In the following description, a result of aggregating coincidence C for each maintenance group will be referred to as aggregation value A. A method of generating aggregation value A may be determined as appropriate from a plurality of types of aggregation methods. Specific examples of the plurality of types of aggregation methods include, for example, a method of simply summing coincidences C, a method of averaging coincidences C, a method of selecting the maximum value from coincidences C, and a method of extracting and averaging a predetermined number of coincidences C in an upper rank.

In step S62, notification determinator 122 generates maintenance plan list ML. Maintenance plan list ML is a list of maintenance groups. For example, the maintenance groups are arranged in a descending order of aggregation value A. FIG. 17B is a diagram illustrating a specific example of maintenance plan list ML.

As illustrated in FIG. 17B, maintenance plan list ML includes data such as a "maintenance plan ID", a "facility", a "maintenance plan", and an "aggregation value". The "maintenance plan ID" data is an identifier given for each maintenance group sorted according to the magnitude of the aggregation value. As the "maintenance plan ID" data, for example, a smaller number is given as the aggregation value becomes greater. The "maintenance plan" data is data indicating a content of maintenance to be performed corresponding to a maintenance group. Notification determinator 122 specifies a maintenance plan corresponding to a maintenance group with reference to the maintenance group information illustrated in FIG. 17A. The "aggregation value" data is data indicating a value of aggregation value A aggregated for each maintenance group.

In the example illustrated in FIG. 17B, in winding facility "A", maintenance of a first winding core that is one of plurality of winding cores 206 is registered as maintenance group 1, and maintenance of a third winding core that is another of plurality of winding cores 206 is registered as maintenance group 2. Maintenance of a second winding core that is still another of plurality of winding cores 206 is registered in maintenance plan list ML as maintenance group 3.

In the maintenance plans illustrated in FIGS. 17A and 17B, the "maintenance of the first winding core" indicates that at least one piece of maintenance work for the first winding core, such as adjustment of the first winding core, cleaning of the first winding core, and replacement of the first winding core is included. The same applies to the "maintenance of the third winding core" and the "maintenance of the second winding core".

As described with reference to FIG. 5, in a case where continuous position of the upper end surface of first sheet material 202 indicated by the first sheet material end position data group and continuous position of the upper end surface of second sheet material 203 indicated by the second sheet material end position data group are tilted with respect to the reference lines, winding body 204 is determined as being defective (or fair). It is known that a cause of the defect of winding body 204 is winding core 206 on which winding body 204 is wound.

Aggregation value A is a value obtained by aggregating coincidences C, and thus has the same property as coincidence C. Thus, as aggregation value A becomes greater, the need for a maintenance content of the maintenance group to be performed on target winding apparatus 200 becomes higher. Since maintenance plan list ML is a list of maintenance groups arranged in a descending order of aggregation value A, a maintenance group in an upper rank in maintenance plan list ML is highly required to be applied to maintenance of target winding apparatus 200.

In step S63, notification determinator 122 determines whether or not aggregation value A is greater than predetermined sign threshold value $Th_f$ for each maintenance group. Predetermined sign threshold value $Th_f$ is the minimum value of aggregation values in which it is supposed that a sign that an abnormality occurs in winding apparatus 200 has occurred. In the present exemplary embodiment, an abnormality in winding apparatus 200 indicates that, for example, winding apparatus 200 produces winding body 204 of which an inspection result indicates "defective" at a predetermined ratio or higher. The sign of abnormality in winding apparatus 200 indicates that, for example, winding apparatus 200 produces winding body 204 of which an inspection result indicates "fair" at a predetermined ratio or higher. Therefore, when aggregation value A is smaller than sign threshold value $Th_f$, it is expected that a ratio in which an inspection result of winding body 204 produced thereafter indicates "good" is a predetermined ratio or higher. Predetermined sign threshold value $Th_f$ may be empirically determined on the basis of, for example, past maintenance result data MD.

In a case where at least one maintenance group for which aggregation value A is greater than sign threshold value $Th_f$ is included in maintenance plan list ML (step S63: YES), notification determinator 122 causes the process to proceed to step S64. In a case where no maintenance group for which aggregation value A is greater than sign threshold value $Th_f$ is included in maintenance plan list ML (step S63: NO), notification determinator 122 finishes the process since it is not necessary to perform a notification that maintenance is to be performed.

In step S64, notification determinator 122 determines whether or not there is a maintenance group for which aggregation value A is greater than predetermined abnormality threshold value $Th_a$ among the maintenance groups included in maintenance plan list ML. Predetermined abnormality threshold value $Th_a$ is the minimum value of aggregation values in which it is supposed that an abnormality has occurred in winding apparatus 200 beyond the sign stage. Thus, abnormality threshold value $Th_a$ is empirically determined to a value greater than sign threshold value $Th_f$ on the basis of, for example, past maintenance result data MD. In a case where a maintenance group for which aggregation value A is greater than abnormality threshold value $Th_a$ is included in maintenance plan list ML (step S64: YES), notification determinator 122 causes the process to proceed to step S66. In a case where a maintenance group for which aggregation value A is greater than abnormality threshold value $Th_a$ is not included in maintenance plan list ML (step S64: NO), notification determinator 122 causes the process to proceed to step S65.

In step S65, notification determinator 122 causes display 132 of notifier 130 to perform a notification of a maintenance content corresponding to the maintenance group for which aggregation value A is determined to be greater than sign threshold value $Th_f$ in step S63. More specifically, notification determinator 122 causes display 132 to display, for example, a content of maintenance work recommended to be executed along with a message such as "Please execute the following maintenance contents". The content of the maintenance work recommended to be executed is a content corresponding to the "maintenance plan" data included in maintenance plan list ML illustrated in FIG. 17B.

Here, in a case where there are a plurality of maintenance groups for which aggregation value A is greater than sign threshold value $Th_f$, notification determinator 122 may display contents of a plurality of pieces of maintenance work by ranking the contents with an aggregation value. In this case, more specifically, notification determinator 122 may display contents of a plurality of pieces of maintenance work recommended to be executed in an order from an upper rank along with a message such as "Please execute the following maintenance contents. In a case where the abnormality is not improved despite a maintenance content in the upper rank being executed, the abnormality may be improved if a maintenance work in the lower rank is executed".

Notification determinator 122 performs a notification of a maintenance plan ID correlated with a maintenance group having a maintenance content along with the maintenance work content. In a case where a worker who has performed maintenance work inputs maintenance result data MD, the worker inputs maintenance result data MD and a maintenance plan ID triggering the maintenance in correlation with each other, and thus it is possible to easily determine whether or not input maintenance result data MD is data corresponding to maintenance work executed with a notification from maintenance display apparatus 100 as a trigger.

In step S66, in the same manner as in step S65, notification determinator 122 displays the content of the maintenance work on display 132, and causes alarm 131 to issue an alarm for a notification that an abnormality has occurred in target winding apparatus 200. In a case where a sign of an abnormality has not occurred but the abnormality has occurred in target winding apparatus 200, urgent maintenance work is required. Thus, notification determinator 122 not only displays the content of the maintenance work on display 132 but also causes alarm 131 to issue an alarm, and thus promptly notifies a user of maintenance display apparatus 100 of the occurrence of the abnormality.

As described above, in the identification process, it is determined whether or not an abnormality (a situation in which a defective product is produced at a predetermined ratio or higher) or a sign of the abnormality has occurred in any of winding cores 206 by using production result data PD (particularly shape data indicating "defective" or "fair" in the shape data group) of produced new winding body 204 and facility state diagnosis model M. In a case where it is determined that an abnormality or a sign of an abnormality has occurred, a notification is sent to a user. Consequently, in a case where an abnormality has occurred in any of winding cores 206, the user can promptly know the abnormality and can know the content of the maintenance work to be performed in order to improve the abnormality.

As described above, it is assumed in the present disclosure that a cause of the defect of winding body 204 is winding core 206 on which winding body 204 is wound. In maintenance display apparatus 100, as described above, any of plurality of winding cores 206 is set as a maintenance work target, an aggregation value is calculated for each maintenance group, and it is determined which maintenance work is to be performed on winding core 206 depending on a magnitude of the aggregation value. Maintenance work is performed on any of plurality of winding cores 206 on the basis of such determination, and thus maintenance work that may highly possibly eliminate the defect of winding body 204 is extracted and displayed.

Update Process

Next, the update process in maintenance effect determinator 123 and facility state diagnosis model generator 124 will be described.

Process in Maintenance Effect Determinator 123

Figure 18:
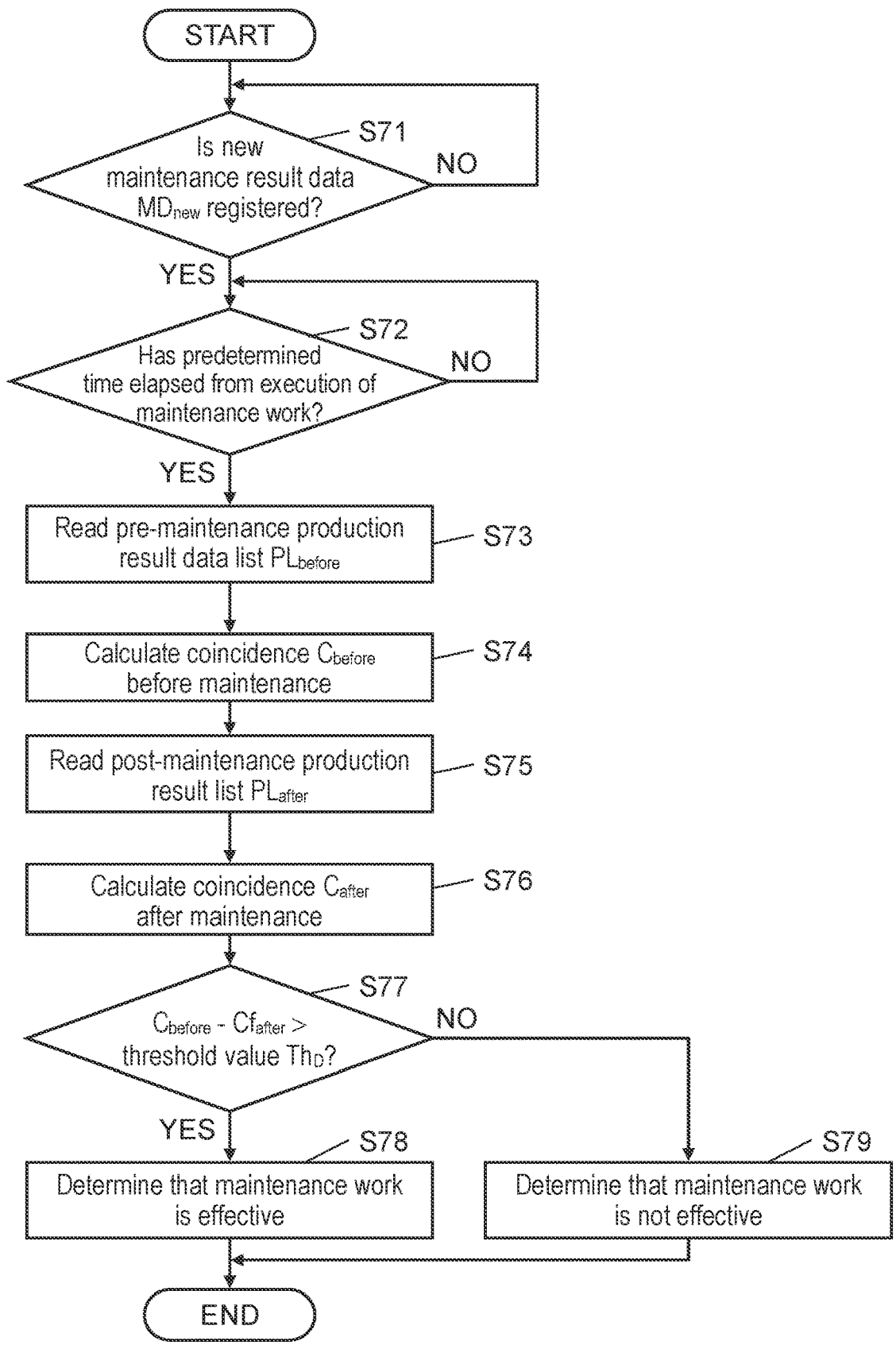
FIG. 18 is a flowchart for describing a process executed by the maintenance effect determinator in an update process.

Hereinafter, a description will be made of processes (processes from step S21 to step S24 in FIG. 10) executed by maintenance effect determinator 123 in the update process. FIG. 18 is a flowchart for describing the processes executed by maintenance effect determinator 123 in the update process.

In step S71, maintenance effect determinator 123 determines whether or not new maintenance result data $MD_{new}$ is registered in maintenance result database 113 of storage 110. In a case where it is determined that new maintenance result data $MD_{new}$ is not registered (step S71: NO), maintenance effect determinator 123 repeatedly executes step S71. In a case where it is determined that new maintenance result data $MD_{new}$ is registered (step S71: YES), maintenance effect determinator 123 causes the process to proceed to step S72.

In step S72, maintenance effect determinator 123 determines whether or not a predetermined time has elapsed from execution of maintenance corresponding to registered new maintenance result data $MD_{new}$ on the basis of the "maintenance date and time" data (refer to FIG. 8) included in registered new maintenance result data $MD_{new}$.

In a case where it is determined that the predetermined time has elapsed from the execution time of the maintenance work (step S72: YES), maintenance effect determinator 123 causes the process to proceed to step S73. In a case where it is determined that the predetermined time has not elapsed from the execution time of the maintenance work (step S72: NO), maintenance effect determinator 123 repeatedly executes the process in step S72.

In step S73, maintenance effect determinator 123 reads pre-maintenance production result data list $PL_{before}$ including all production result data PD of winding bodies 204 produced in a period a predetermined time before the maintenance work from production result database 111.

In step S74, maintenance effect determinator 123 reads facility state diagnosis model M included in a maintenance group having a maintenance content corresponding to new maintenance result data $MD_{new}$ from facility state diagnosis model database 112, and generates pre-maintenance coincidence $C_{before}$ on the basis of read facility state diagnosis model M and production result data list $PL_{before}$. A method of generating pre-maintenance coincidence $C_{before}$ is the same as the method of generating coincidence C in facility state diagnoser 121 in step S53 in FIG. 15.

In step S75, maintenance effect determinator 123 reads production result data list $PL_{after}$ including all production result data PD of winding bodies 204 produced within a predetermined time after the maintenance work from production result database 111.

In step S76, maintenance effect determinator 123 reads facility state diagnosis model M included in the maintenance group having the maintenance content corresponding to maintenance result data $MD_{new}$ from facility state diagnosis model database 112, and generates post-maintenance coincidence $C_{after}$ on the basis of read facility state diagnosis model M and production result data list $PL_{after}$. A method of generating coincidence $C_{after}$ is the same as the method of generating coincidence C in facility state diagnoser 121 in step S53 in FIG. 15.

In step S77, maintenance effect determinator 123 takes a difference between pre-maintenance coincidence $C_{before}$ and post-maintenance coincidence $C_{after}$, and determines whether or not the difference is greater than predetermined threshold value $Th_D$. Maintenance effect determinator 123 causes the process to proceed to step S78 in a case where the difference is greater than the threshold $Th_D$ (step S77: YES), and causes the process to proceed to step S79 in other cases (step S77: NO). Predetermined threshold value $Th_D$ may be determined as appropriate on the basis of the past maintenance work results and the like.

In step S78, since post-maintenance coincidence $C_{after}$ is less than pre-maintenance coincidence $C_{before}$, maintenance effect determinator 123 determines that the maintenance work performed on the basis of the maintenance content of which the notification has been performed by notification determinator 122 is effective.

In step S79, since post-maintenance coincidence $C_{after}$ is not less than pre-maintenance coincidence $C_{before}$, maintenance effect determinator 123 determines that the maintenance work performed on the basis of the maintenance content of which the notification has been performed by notification determinator 122 is not effective or the effect is very small.

Figure 19A:
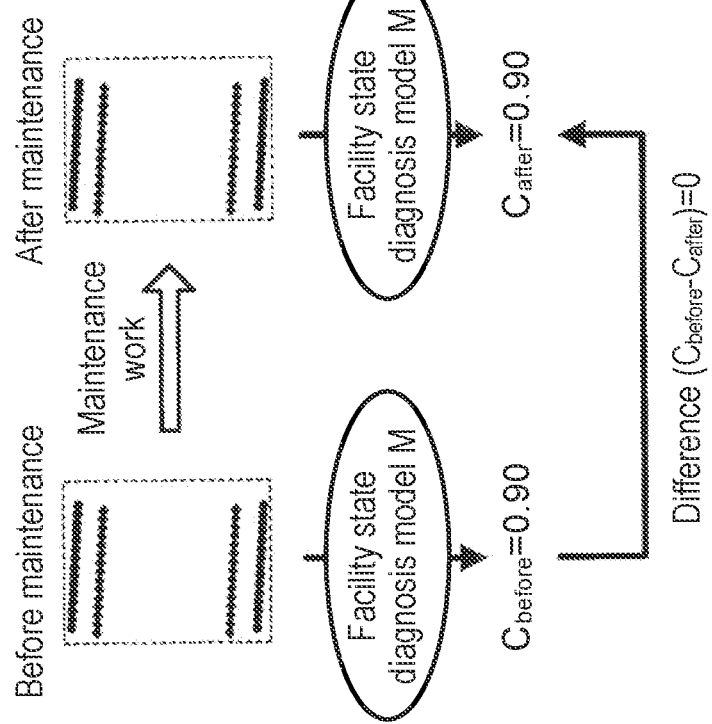
FIG. 19A is a conceptual diagram for describing a scene in which an effect of maintenance work is determined in the update process.
Figure 19B:
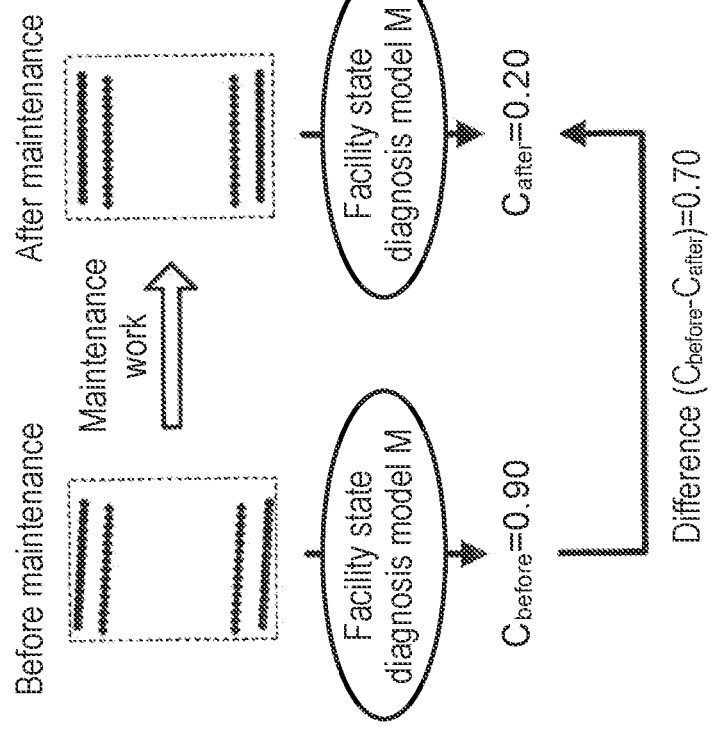
FIG. 19B is a conceptual diagram for describing a scene in which an effect of maintenance work is determined in the update process.

FIGS. 19A and 19B are conceptual diagrams for describing a scene in which an effect of maintenance work in the update process is determined. FIG. 19A illustrates an example of a case where it is determined that the maintenance work is effective, and FIG. 19B illustrates an example of a case where it is determined that the maintenance work is not effective.

In the examples illustrated in FIGS. 19A and 19B, pre-maintenance coincidence $C_{before}$=0.90 is calculated on the basis of the shape data group of winding bodies 204 produced before maintenance and facility state diagnosis model M.

In the example illustrated in FIG. 19A, post-maintenance coincidence $C_{after}$=0.20 is calculated on the basis of the shape data of winding body 204 produced after maintenance and facility state diagnosis model M. On the other hand, in the example illustrated in FIG. 19B, post-maintenance coincidence $C_{after}$=0.90 is calculated on the basis of the shape data of winding body 204 produced after maintenance and facility state diagnosis model M.

Therefore, in the example illustrated in FIG. 19A, a difference between pre-maintenance coincidence $C_{before}$ and post-maintenance coincidence $C_{after}$ is 0.70. On the other hand, in the example illustrated in FIG. 19B, a difference between pre-maintenance coincidence $C_{before}$ and post-maintenance coincidence $C_{after}$ is 0. Therefore, for example, in a case where threshold value $Th_D$ for determining the presence or absence of the maintenance effect is 0.30, it is determined that the maintenance work is effective in the example illustrated in FIG. 19A, and it is determined that the maintenance work is not effective in the example illustrated in FIG. 19B.

Processes in Facility State Diagnosis Model Generator 124

Figure 20:
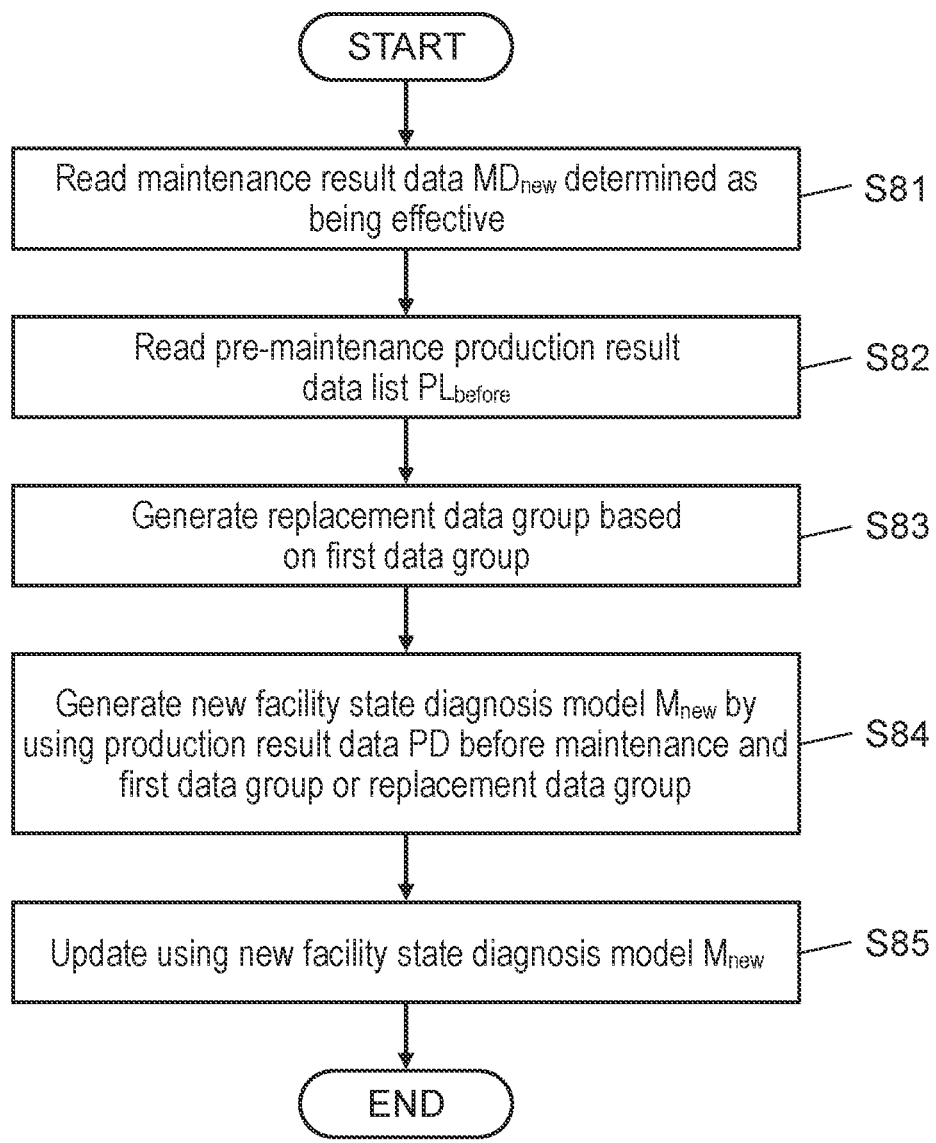
FIG. 20 is a flowchart for describing a process executed by the facility state diagnosis model generator in the update process.

Next, processes (the processes in steps S25 and S26 in FIG. 10) executed by facility state diagnosis model generator 124 in the update process will be described. FIG. 20 is a flowchart for describing the processes executed by facility state diagnosis model generator 124 in the update process.

In step S81, facility state diagnosis model generator 124 reads maintenance result data $MD_{new}$ of the maintenance work determined as being effective by maintenance effect determinator 123.

In step S82, facility state diagnosis model generator 124 reads pre-maintenance production result data list $PL_{before}$ from production result database 111. Here, pre-maintenance production result data list $PL_{before}$ read by facility state diagnosis model generator 124 is the same as pre-maintenance production result data list $PL_{before}$ read in the process performed by maintenance effect determinator 123 (refer to step S31 in FIG. 11).

In step S83, facility state diagnosis model generator 124 uses the first data group corresponding to read pre-maintenance production result data list $PL_{before}$ to generate a replacement data group in which pieces of image data are replaced with each other among a plurality of data sets included in the first data group. The process in step S83 is the same process as the process in step S43 illustrated in FIG. 13.

In step S84, facility state diagnosis model generator 124 generates new facility state diagnosis model $M_{new}$ by using read maintenance result data MD and one of the first data group and the replacement data group.

In step S85, facility state diagnosis model generator 124 adds new facility state diagnosis model $M_{new}$ to facility state diagnosis model M already registered in facility state diagnosis model database 112, and thus updates facility state diagnosis model M.

As mentioned above, in the update process, new facility state diagnosis model $M_{new}$ is generated by using facility state diagnosis model M generated in the learning process, and facility state diagnosis model M already registered in facility state diagnosis model database 112 is updated by using new facility state diagnosis model $M_{new}$. As described above, facility state diagnosis model M in facility state diagnosis model database 112 is updated by using new facility state diagnosis model $M_{new}$ on the basis of the effective maintenance work, and thus diagnosis accuracy of a facility state of winding apparatus 200 in facility state diagnoser 121 is gradually improved.

According to a display method of displaying information for maintenance of a production apparatus related to the present disclosure, fifth group data indicating a position of a fifth end surface of a first electrode sheet along a radial direction of a third winding body in which the first electrode sheet and a second electrode sheet are wound in an overlapping manner by a plurality of turns on a first winding core and sixth group data indicating a position of a sixth end surface of the second electrode sheet along the radial direction of the third winding body are input to a learned model that is created according to a learned model generation method related to the present disclosure. In a case where it is determined that the third winding body has a defect, and information indicating that a cause of the defect is a first winding core is output from the learned model, on the basis of a positional relationship among continuous positions of the fifth end surface indicated by the fifth group data, continuous positions of the sixth end surface indicated by the sixth group data, and reference lines, information indicating that the third winding body has the defect and a cause of the defect is the first winding core is output to a display apparatus.

Operation and Effect of Maintenance Display Apparatus 100 of First Exemplary Embodiment As described above, maintenance display apparatus 100 includes notification determinator 122, and facility state diagnosis model generator 124 that is an example of a model generator. Notification determinator 122 acquires a plurality of pieces of group data indicating positions of the end surface read along the radial direction for each of plurality of winding bodies 204 wound on plurality of winding cores 206, from inspection machine 207 as a sensor. Notification determinator 122 determines whether or not winding body 204 is defective on the basis of whether or not continuous positions of the first end surface indicated by the first group data intersect continuous positions of the second end surface indicated by the second group data. In a case where winding body 204 is defective, notification determinator 122 outputs information indicating that a cause of the defect is any of plurality of winding cores 206 to display 132 for maintenance. Facility state diagnosis model generator 124 uses the plurality of pieces of group data to generate a shape data set in which any of plurality of winding cores 206 is correlated with any of the plurality of pieces of group data and also to generate a replacement data set in which correspondence relationships between winding core 206 and the group data are replaced with each other in all combinations of plurality of winding cores 206 and the plurality of pieces of group data. Facility state diagnosis model generator 124 uses the replacement data set to generate or update plurality of learned models M indicating that a cause of the defect is any of plurality of winding cores 206.

As described above, according to maintenance display apparatus 100 related to the first exemplary embodiment, when, of plurality of winding cores $206x$ and $206y$, a shape data group including the shape data (image Iy) of winding body $204y$ wound on winding core $206y$ actually having a defect is acquired, a replacement data set is generated in which the shape data (image Iy) of winding body $204y$ actually having the defect is correlated with winding core $206x$ on which winding body $204x$ not actually having the defect is wound. Facility state diagnosis model M (first facility state diagnosis model) indicating that a cause of the defect is winding core $206y$ among plurality of winding cores 206 is generated by using data set DSγ in which winding core $206y$ on which winding body $204y$ actually having defect is wound is correlated with the shape data (image Ix) of winding body $204y$ actually having the defect, and facility state diagnosis model M (second facility state diagnosis model) indicating that a cause of the defect is winding core $206x$ in a case of assuming that shape data indicating that the defect has occurred in winding body $204x$ not actually having the defect is acquired is also generated by using replacement data set DSxy in which winding core $206x$ on which winding body $204x$ not actually having the defect is wound is correlated with the shape data (image Iy) of winding body $204y$ actually having the defect.

With this configuration, facility state diagnosis model M in a case where all of plurality of winding cores 206 are causes of defects can be generated by using only the shape data group in which any of plurality of winding cores 206 is a cause of a defect.

According to the method of generating facility state diagnosis model M, training data for generating facility state diagnosis model M can be apparently increased, and thus a large number of facility state diagnosis models M can be generated. As a result, a special effect can be obtained in which the diagnosis accuracy of a cause of a defect using facility state diagnosis model M in the subsequent identification process can be easily improved.

In the identification process, maintenance display apparatus 100 calculates coincidence C between the shape data of winding body 204 produced after the maintenance work and facility state diagnosis model M for each maintenance group by using facility state diagnosis model M generated as described above, and determines whether to perform issuing of an alarm and a notification of a content of the maintenance work, to perform only the notification of the content of the maintenance work, or not to perform the notification on the basis of a magnitude of coincidence C.

With this configuration, it is possible to appropriately diagnose a state of winding apparatus 200 by using a learned model (facility state diagnosis model M) that is generated on the basis of effective maintenance work (reduced defect ratio) among pieces of actually performed maintenance work. Since the learned model is updated at any time, the accuracy of diagnosis can be improved. In a case where it is diagnosed that an abnormality has occurred in winding apparatus 200, a user can take an emergency response by issuing an alarm, and, in a case where it is diagnosed that a sign of an abnormality has occurred, the user is notified of a content of the maintenance work by which the abnormality is expected to be improved, and thus the maintenance work can be executed while the occurrence ratio of defective products in winding apparatus 200 is low.

In maintenance display apparatus 100 according to the first exemplary embodiment, any of plurality of winding cores 206 is assumed to be a cause of a defect occurring in winding body 204. In maintenance display apparatus 100 according to the first exemplary embodiment, notification determinator 122 aggregates coincidence C for each maintenance group, and determines a content of maintenance work of which a notification is sent to a user on the basis of a magnitude of aggregation value A. Thus, for any of plurality of winding cores 206, a notification of maintenance work having the highest probability of defect improvement through maintenance thereof is sent to the user. In a case where there are a plurality of pieces of maintenance work having a high probability, the plurality of pieces of maintenance work are displayed in a ranked state. Consequently, a user performs maintenance work of which a notification has been sent in a descending order of rank, and thus a defect of winding body 204 is suitably improved.

The maintenance display apparatus according to the present exemplary embodiment includes a notifier, a maintenance effect determinator, and a facility state diagnosis model generator. The notifier performs, for each piece of maintenance work performed in the past, a notification of a content of the maintenance work on the basis of a facility state diagnosis model that is registered in a database in correlation between the content of the maintenance work and production result data before the maintenance work, and input new production result data. The maintenance effect determinator determines whether or not the maintenance work is effective on the basis of production result data before the time at which the maintenance work is performed and production result data after the time at which the maintenance work is performed. The facility state diagnosis model generator generates a new facility state diagnosis model on the basis of the production result data before the time at which the maintenance work determined as being effective is performed and the content of the maintenance work determined as being effective.

The maintenance display apparatus according to the present exemplary embodiment further includes a facility state diagnoser that generates a facility state diagnosis index indicating the degree of coincidence between registered new production result data and production result data before the maintenance work included in the facility state diagnosis model. The notifier performs a notification of the content of the maintenance work on the basis of the facility state diagnosis index.

In the maintenance display apparatus according to the present exemplary embodiment, the facility state diagnosis model generator generates the facility state diagnosis model through machine learning by using production result data before the time at which maintenance work determined as being effective is performed and maintenance result data regarding the maintenance work.

The maintenance display apparatus according to the present exemplary embodiment calculates a defect ratio in which an inspection result indicates defective in production result data for a predetermined time before the time at which maintenance work in input new maintenance result data is performed, on the basis of data regarding the inspection result for a product of a production facility included in production result data in a case where maintenance work not based on a content of maintenance work of which a notification has been performed by the notifier is performed and the new maintenance result data regarding the maintenance work is input. A defect ratio in which an inspection result indicates defective in production result data for a predetermined time after the time at which maintenance work in the input new maintenance result data is performed is calculated. The maintenance effect determinator calculates a difference between the defect ratio before the maintenance work and the defect ratio after the maintenance work, and determines whether or not the maintenance work is effective on the basis of a magnitude of the difference.

Second Exemplary Embodiment

Figure 21:
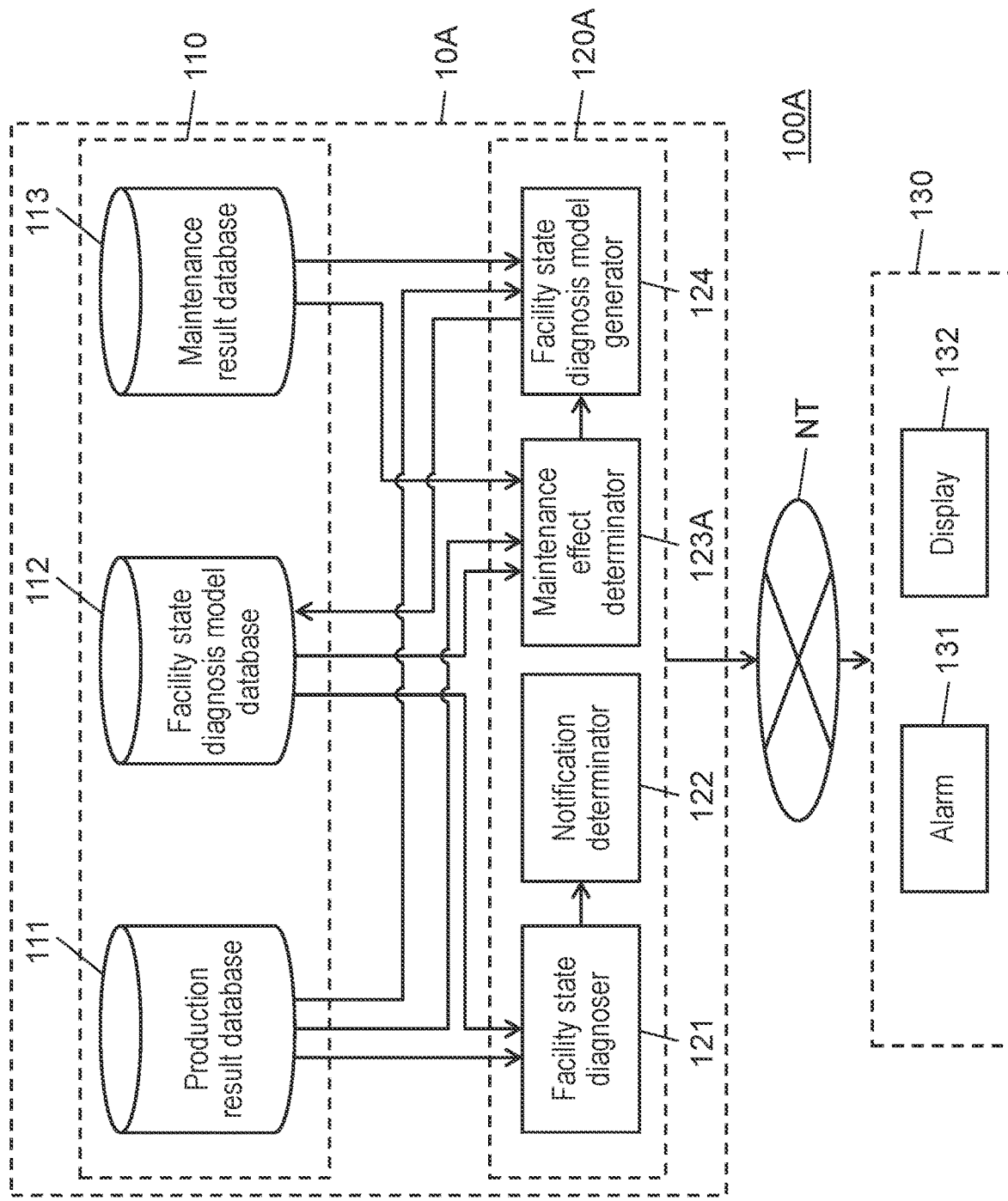
FIG. 21 is a diagram exemplifying a configuration of a maintenance display apparatus according to a second exemplary embodiment.

Hereinafter, a second exemplary embodiment of the present disclosure will be described. FIG. 21 is a diagram exemplifying a configuration of maintenance display apparatus 100A according to the second exemplary embodiment. In maintenance display apparatus 100A according to the second exemplary embodiment, a process performed by maintenance effect determinator 123A included in controller 120A of server 10A is different from the process performed by maintenance effect determinator 123 according to the first exemplary embodiment described above.

Hereinafter, differences from the first exemplary embodiment will be described. The same constituent as that in the first exemplary embodiment will be given the same reference numeral as that in the first exemplary embodiment, and a constituent different from that in the first exemplary embodiment will be given the reference numeral added with "A".

In the first exemplary embodiment, it is not supposed that a user of maintenance display apparatus 100 performs maintenance work other than a content of which notification has been performed by maintenance display apparatus 100. However, actually, in terms of operation of winding apparatus 200, maintenance work (maintenance work other than a maintenance content of which a notification has been performed by maintenance display apparatus 100) may be performed at any time depending on the decisions on the site or the like. In the second exemplary embodiment, a description will be made of maintenance display apparatus 100A that can cope with a case of performing maintenance work other than a maintenance content of which a notification has been performed by maintenance display apparatus 100A.

Figure 22:
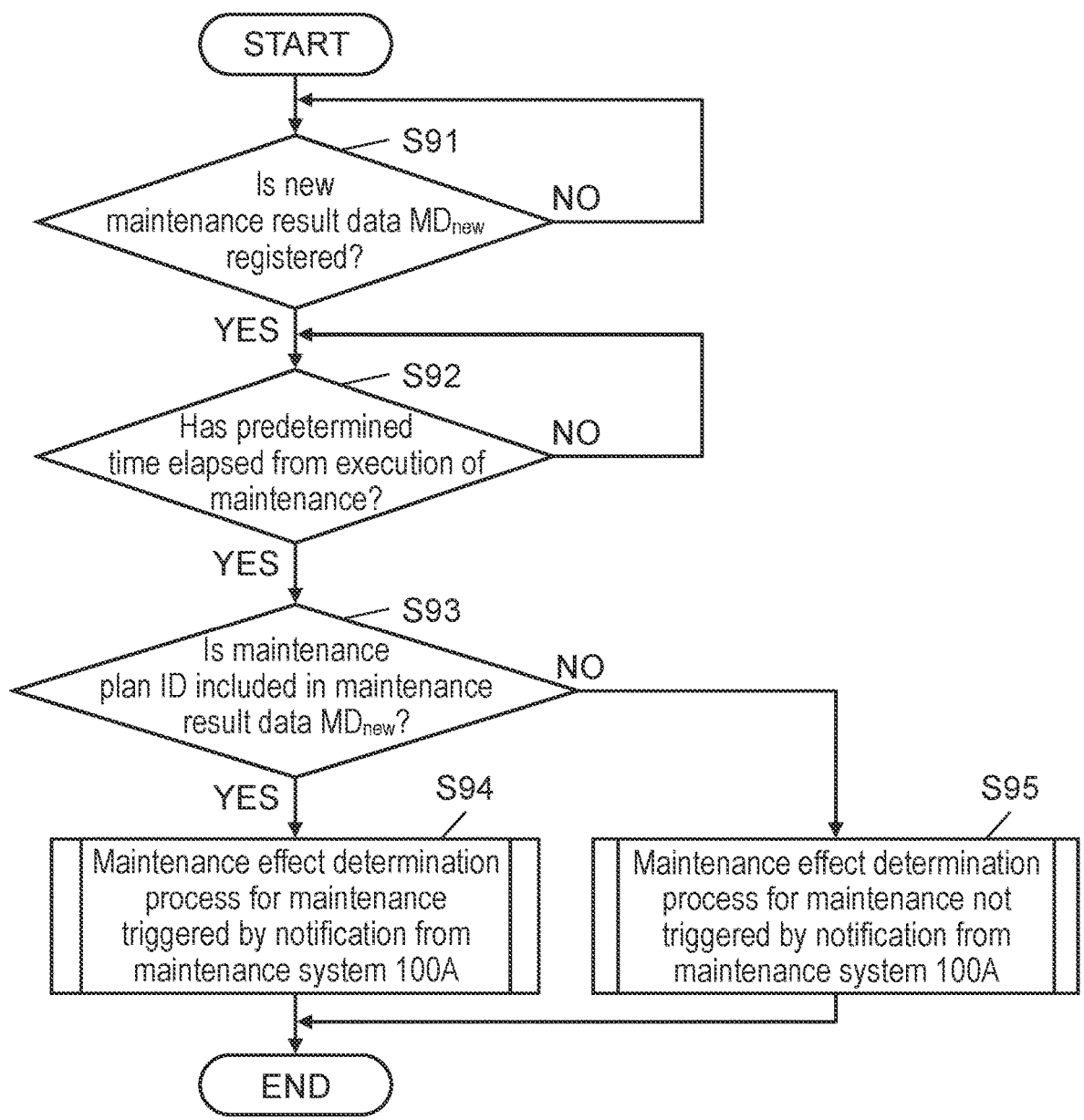
FIG. 22 is a flowchart for describing a process executed by a maintenance effect determinator in the second exemplary embodiment.

FIG. 22 is a flowchart for describing processes executed by maintenance effect determinator 123A in the second exemplary embodiment.

In step S91 in FIG. 22, maintenance effect determinator 123A determines whether or not new maintenance result data $MD_{new}$ is registered in maintenance result database 113 of storage 110. In a case where it is determined that new maintenance result data $MD_{new}$ is not registered (step S91: NO), maintenance effect determinator 123A repeatedly executes step S91. In a case where it is determined that new maintenance result data $MD_{new}$ is registered (step S91: YES), maintenance effect determinator 123A causes the process to proceed to step S92.

In step S92, maintenance effect determinator 123A determines whether or not a predetermined time has elapsed from execution of maintenance work corresponding to registered new maintenance result data $MD_{new}$ on the basis of the maintenance date and time data included in registered new maintenance result data $MD_{new}$. In the same manner as the predetermined time described in the first exemplary embodiment, the predetermined time is the time required for target winding apparatus 200 to manufacture a certain number or more of winding bodies 204 after execution of maintenance work.

In a case where it is determined that the predetermined time has elapsed from the execution of maintenance work (step S92: YES), maintenance effect determinator 123A causes the process to proceed to step S93. In a case where it is determined that the predetermined time has not elapsed from the execution of maintenance work (step S92: NO), maintenance effect determinator 123A repeatedly executes the process in step S92.

In step S93, maintenance effect determinator 123A determines whether or not there is a maintenance plan ID correlated with registered new maintenance result data $MD_{new}$. As described in the first exemplary embodiment, notification determinator 122 performs a notification of a maintenance work content and a maintenance plan ID correlated with a maintenance group having the maintenance content. A worker performs maintenance work indicated by the maintenance plan ID of which a notification has been performed. The worker inputs maintenance result data MD by correlating the performed maintenance work with the maintenance plan ID of which a notification has been performed. Consequently, maintenance result data MD and the maintenance plan ID triggering the maintenance are correlated with each other. In this step S93, it is determined whether or not registered new maintenance result data $MD_{new}$ is maintenance performed with the notification performed by maintenance display apparatus 100A as a trigger in the above-described way.

In step S93, in a case where there is a maintenance plan ID correlated with registered new maintenance result data $MD_{new}$, it is determined that the maintenance work corresponding to maintenance result data $MD_{new}$ has been performed with a notification of maintenance contents from maintenance display apparatus 100A as a trigger. In a case where a maintenance plan ID correlated with registered new maintenance result data $MD_{new}$ is not present, it is determined that the maintenance work corresponding to maintenance result data $MD_{new}$ has not been performed with a notification of maintenance contents from maintenance display apparatus 100A as a trigger.

In step S93, in a case where it is determined that the maintenance plan ID is included in registered new maintenance result data $MD_{new}$ (step S93: YES), maintenance effect determinator 123A causes the process to proceed to step S94. On the other hand, in a case where it is determined that the maintenance plan ID is not included in maintenance result data $MD_{new}$ (step S93: NO), maintenance effect determinator 123A causes the process to proceed to step S95.

Step S94 is a process in a case where the maintenance work corresponding to registered new maintenance result data $MD_{new}$ has been triggered by the notification of the maintenance content from maintenance display apparatus 100A. Thus, in step S94, maintenance effect determinator 123A proceeds to a process of determining whether or not there is an effect of the maintenance work triggered by the notification of the maintenance content from maintenance display apparatus 100A. The maintenance effect determination process for maintenance triggered by the notification of the maintenance content from maintenance display apparatus 100A is substantially the same as the process described with reference to FIG. 18 in the above-described first exemplary embodiment, and thus a description thereof will not be repeated.

On the other hand, step S95 is a process in a case where the maintenance work corresponding to maintenance result data $MD_{new}$ has not been triggered by the notification of the maintenance content from maintenance display apparatus 100A. Thus, maintenance effect determinator 123A proceeds to a process of determining whether or not there is an effect of the maintenance work not triggered by maintenance display apparatus 100A. The maintenance effect determination process for maintenance not triggered by the notification of the maintenance content from maintenance display apparatus 100A is substantially the same as the process described with reference to FIG. 11 in the above-described first exemplary embodiment, and thus a description thereof will not be repeated.

As described above, according to maintenance display apparatus 100A related to the second exemplary embodiment, maintenance result data $MD_{new}$ can be suitably registered even in a case where maintenance work not triggered by a notification of a maintenance content from maintenance display apparatus 100A has been performed. The process of maintenance effect determinator 123A described with reference to FIG. 22 may be executed in either the learning process or the update process described above.

The maintenance display apparatus according to the present exemplary embodiment generates a facility state diagnosis index before maintenance work on the basis of production result data for a predetermined time before the time at which the maintenance work in registered new maintenance result data is performed, and a facility state diagnosis model correlated with a content of maintenance work in a notification triggering maintenance work in input new maintenance result data. A facility state diagnosis index after maintenance work is generated on the basis of production result data for a predetermined time after the time at which the maintenance work in input new maintenance result data is performed, and a facility state diagnosis model correlated with a content of maintenance work in a notification triggering maintenance work in input new maintenance result data. The maintenance effect determinator calculates a difference between the facility state diagnosis index before the maintenance work and the facility state diagnosis index after the maintenance work, and determines whether or not the maintenance work is effective on the basis of a magnitude of the difference.

Third Exemplary Embodiment

Figure 23:
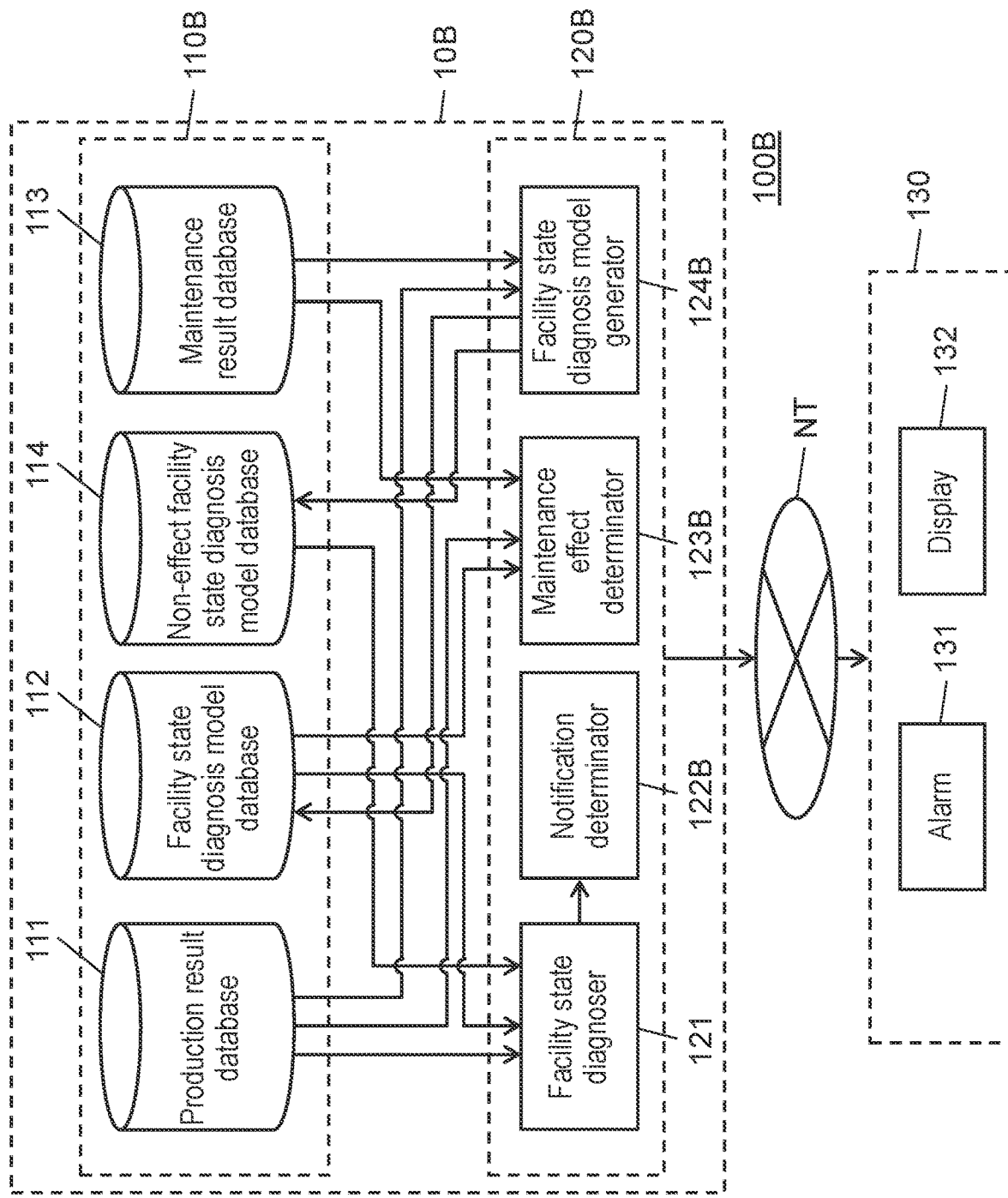
FIG. 23 is a diagram exemplifying a configuration of a maintenance display apparatus according to a third exemplary embodiment.

Hereinafter, a third exemplary embodiment of the present disclosure will be described. FIG. 23 is a diagram exemplifying a configuration of maintenance display apparatus 100B according to the third exemplary embodiment. Maintenance display apparatus 100B according to the third exemplary embodiment is different from maintenance display apparatus 100 according to the first exemplary embodiment described above in that storage 110B of server 10B further includes non-effect facility state diagnosis model database 114, and controller 120B includes notification determinator 122B, maintenance effect determinator 123B, and facility state diagnosis model generator 124B.

In the first exemplary embodiment described above, facility state diagnosis model generator 124 generates new facility state diagnosis model $M_{new}$ by using maintenance result data MD determined as being effective (refer to FIG. 13). In the third exemplary embodiment, facility state diagnosis model generator 124B generates new facility state diagnosis model $M_{new}$ by also using maintenance result data MD determined as being ineffective.

Figure 24:
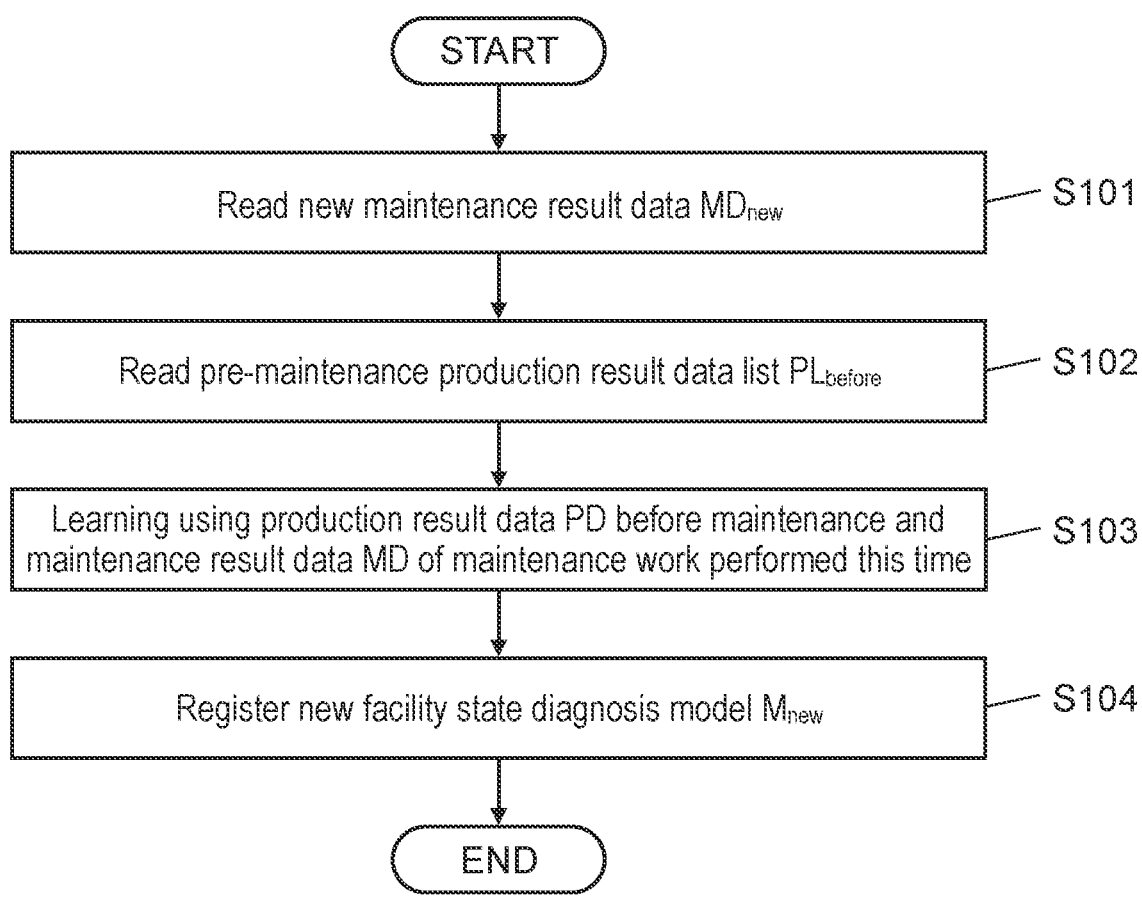
FIG. 24 is a flowchart for describing a process performed by a facility state diagnosis model generator in the third exemplary embodiment.

FIG. 24 is a flowchart for describing processes performed by facility state diagnosis model generator 124B in the third exemplary embodiment. The processes described with reference to FIG. 24 may be executed in either the learning process or the update process.

In step S101, facility state diagnosis model generator 124B reads registered new maintenance result data $MD_{new}$ from maintenance result database 113. Here, facility state diagnosis model generator 124B reads maintenance result data $MD_{new}$ regardless of an effect determination result determined by maintenance effect determinator 123B.

In step S102, facility state diagnosis model generator 124B reads production result data list $PL_{before}$ before maintenance work from production result database 111.

In step S103, facility state diagnosis model generator 124B generates facility state diagnosis model $M_{new}$ by using read maintenance result data $MD_{new}$ and production result data PD included in production result data list $PL_{before}$.

In step S104, facility state diagnosis model generator 124B registers a model that is generated on the basis of maintenance result data MD determined as being ineffective among generated new facility state diagnosis models $M_{new}$, into non-effect facility state diagnosis model database 114. On the other hand, facility state diagnosis model generator 124B registers a model that is generated on the basis of maintenance result data MD determined as being effective among generated new facility state diagnosis models $M_{new}$, into facility state diagnosis model database 112.

In the above-described way, facility state diagnosis model generator 124B not only generates facility state diagnosis model M using maintenance result data MD related to maintenance determined as being effective but also generates facility state diagnosis model M using maintenance result data MD related to maintenance determined as being ineffective.

An identification process is executed by facility state diagnoser 121 and notification determinator 122B by using facility state diagnosis model M generated in the above-described way. Processes executed by facility state diagnoser 121 is substantially the same as the processes described with reference to FIG. 15 in the first exemplary embodiment described above, and thus a description thereof will not be repeated.

Figure 25:
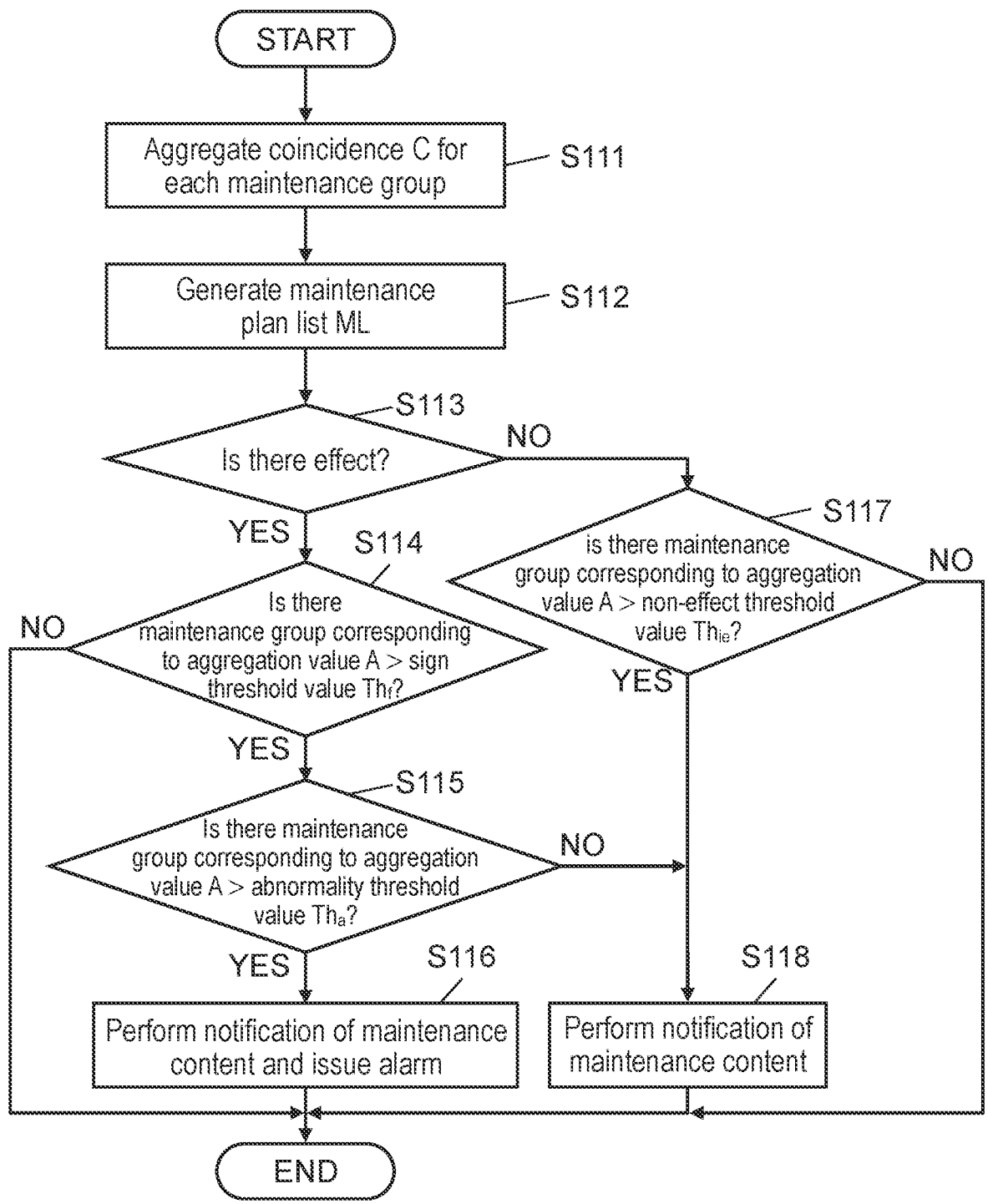
FIG. 25 is a flowchart for describing a process performed by a notification determinator in the third exemplary embodiment.

Hereinafter, a description will be made of processes executed by notification determinator 122B in the identification process of the third exemplary embodiment. FIG. 25 is a flowchart for describing the processes performed by notification determinator 122B in the third exemplary embodiment.

In step S111, notification determinator 122B aggregates coincidence C for each maintenance group by using coincidence C generated by facility state diagnoser 121, and thus generates aggregation value A. In the third exemplary embodiment, information (flag) indicating whether or not maintenance work is determined as being effective is correlated with each maintenance group by maintenance effect determinator 123B.

In step S112, notification determinator 122B generates maintenance plan list ML that is a list of maintenance groups arranged in a descending order of aggregation value A.

In step S113, notification determinator 122B determines whether or not each maintenance group included in maintenance plan list ML is determined as being effective. As described above, in the third exemplary embodiment, since facility state diagnoser 121 correlates a flag indicating the presence or absence of an effect with each maintenance group, notification determinator 122B performs the process in step S113 by referring to the flag. Notification determinator 122B causes the process to proceed to step S114 with respect to a maintenance group of maintenance work determined as being effective (step S113: YES). On the other hand, notification determinator 122B causes the process to proceed to step S117 with respect to a maintenance group of maintenance work determined as being ineffective (step S113: NO).

In step S114, notification determinator 122B determines whether or not aggregation value A is greater than predetermined sign threshold value $Th_f$ for each maintenance group determined as being effective. In a case where there is at least one maintenance group for which aggregation value A is greater than sign threshold value $Th_f$ (step S114: YES), notification determinator 122B causes the process to proceed to step S115. In a case where there is no maintenance group for which aggregation value A is greater than sign threshold value $Th_f$ (step S114: NO), notification determinator 122B finishes the process.

In step S115, notification determinator 122B determines whether or not there is a maintenance group for which aggregation value A is greater than predetermined abnormality threshold value $Th_a$ among maintenance groups determined as being effective. In a case where there is a maintenance group for which aggregation value A is greater than abnormality threshold value $Th_a$ (step S115: YES), notification determinator 122B causes the process to proceed to step S116. In a case where there is no maintenance group for which aggregation value A is greater than abnormality threshold value $Th_a$ (step S115: NO), notification determinator 122B causes the process to proceed to step S118.

In step S116, notification determinator 122B performs a notification of a maintenance content corresponding to the maintenance group for which aggregation value A is determined as being greater than sign threshold value $Th_f$ in step S114, and also issues an alarm for a notification that an abnormality has occurred in target winding apparatus 200.

In step S117, notification determinator 122B determines whether or not aggregation value A is greater than predetermined non-effect threshold value $Th_{ie}$ for each maintenance group related to maintenance determined as being ineffective. Non-effect threshold value $Th_{ie}$ is the minimum value of aggregation values supposed to perform a notification that there is no effect. In a case where there is a maintenance group for which aggregation value A is greater than non-effect threshold value $Th_{ie}$ (step S117: YES), notification determinator 122B causes the process to proceed to step S118. In a case where there is no maintenance group for which aggregation value A is greater than non-effect threshold value $Th_{ie}$ (step S117: NO), notification determinator 122B finishes the process.

In step S118, notification determinator 122B performs a notification of a maintenance content corresponding to the maintenance group for which aggregation value A is determined as being greater than sign threshold value $Th_f$ in step S114. Notification determinator 122B also performs a notification of a maintenance content corresponding to the maintenance group for which aggregation value A is determined as being greater than non-effect threshold value $Th_{ie}$ in step S117.

With this configuration, according to maintenance display apparatus 100B related to the third exemplary embodiment, it is possible to notify a user of not only a maintenance content that is supposed to be able to improve winding apparatus 200 but also a content of maintenance work that was performed in the past but was not effective. Consequently, the user can avoid a situation in which ineffective maintenance work is repeatedly performed, so that the time required for maintenance can be reduced and the labor required for the maintenance can also be reduced.

In the maintenance display apparatus according to the present exemplary embodiment, the facility state diagnosis model generator generates a new facility state diagnosis model on the basis of production result data before the time at which maintenance work determined as being ineffective is performed, and maintenance result data regarding the maintenance work. The notifier performs a notification of a content of maintenance work determined as being effective as effective maintenance work, and also performs a notification of a content of maintenance work correlated with a facility state diagnosis model that is generated on the basis of maintenance result data regarding maintenance work determined as being ineffective as ineffective maintenance work.

MODIFICATION EXAMPLES

Although the exemplary embodiments according to the present disclosure have been described above with reference to the drawings, the present disclosure is not limited to such examples. It is clear that a person skilled in the art can conceive of various changes or modifications within the scope of the claims, and it is understood that they are naturally included in the technical scope of the present disclosure. The respective constituents in the above-described exemplary embodiment may be arbitrarily combined with each other within the scope without departing from the disclosed concept.

Modification Example 1

In the above-described exemplary embodiment, in the learning process, in the process of maintenance effect determinator 123 determining whether or not maintenance work is effective, it is determined whether or not the maintenance work is effective depending on whether or not a difference between defect ratios before and after the maintenance work is greater than a predetermined threshold value (refer to FIGS. 12A and 12B).

However, maintenance effect determinator 123 may determine whether or not maintenance work is effective by using other methods. FIGS. 26A and 26B are diagrams for describing a modification example of a method of maintenance effect determinator 123 determining whether or not maintenance work is effective in the learning process.

In the examples illustrated in FIGS. 26A and 26B, the presence or absence of an effect is determined on the basis of whether or not post-maintenance defect ratio $Nf_{after}$ is greater than a predetermined threshold value (for example, 20%) without referring to a pre-maintenance defect ratio. In the example illustrated in FIG. 26A, $Nf_{after}$=0%, which is less than the predetermined threshold value of 20%, and thus it is determined that there is an effect. On the other hand, in the example illustrated in FIG. 26B, $Nf_{after}$=40%, which is greater than the predetermined threshold value of 20%, and thus it is determined that there is no effect.

Similarly, in the update process, maintenance effect determinator 123 may determine whether or not the maintenance work is effective by using a method different from that in the above-described exemplary embodiment.

In the above-described exemplary embodiment, in the update process, in the process of maintenance effect determinator 123 determining whether or not maintenance work is effective, the presence or absence of an effect is determined depending on whether or not a difference between coincidences before and after the maintenance work is greater than a predetermined threshold value (refer to FIGS. 19A and 19B).

Figure 27A:
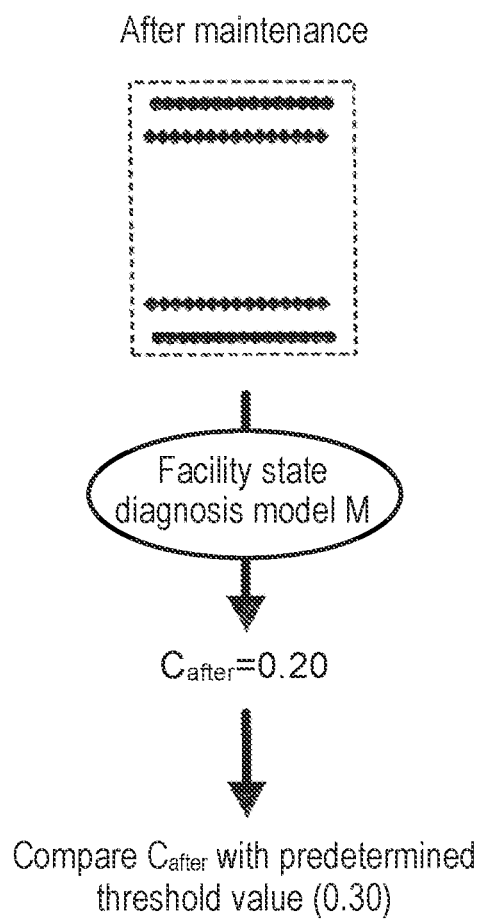
FIG. 27A is a diagram for describing a modification example of a method of determining whether or not maintenance work is effective in the maintenance effect determinator in an update process.
Figure 27B:
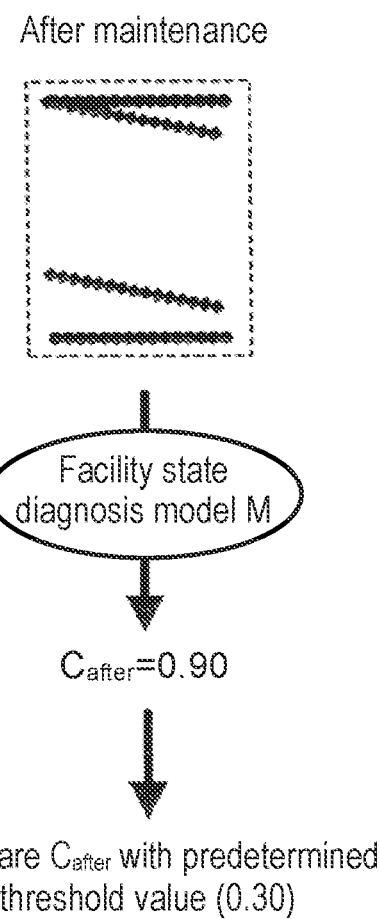
FIG. 27B is a diagram for describing a modification example of a method of determining whether or not maintenance work is effective in the maintenance effect determinator in the update process.

FIGS. 27A and 27B are diagrams for describing a modification example of a method of maintenance effect determinator 123 determining whether or not maintenance work is effective in the update process.

In the examples illustrated in FIGS. 27A and 27B, the presence or absence of an effect is determined on the basis of whether or not post-maintenance coincidence $C_{after}$ is greater than a predetermined threshold value (for example, 0.30) without referring to the pre-maintenance coincidence. In the example illustrated in FIG. 27A, $C_{after}$=0.20, which is less than the predetermined threshold value of 0.30, and thus it is determined that there is an effect. On the other hand, in the example illustrated in FIG. 27B, since $C_{after}$=0.90, which is greater than the predetermined threshold value of 0.30, and thus it is determined that there is no effect.

Modification Example 2

In the above-described exemplary embodiment, facility state diagnosis model generator 124 generates facility state diagnosis model M that is a learned model in which corresponding maintenance work that is effective to a certain defect has been learned, and notification determinator 122 determines whether or not to perform a notification that maintenance work is to be performed by using the model. However, the present disclosure is not limited thereto, and it may be determined whether or not winding body 204 is defective on the basis of only shape data (refer to FIG. 5) of produced winding body 204. In a case where winding body 204 is defective, a notification may be performed such that maintenance work for any of plurality of winding cores 206, or first bonding roller 205A or second bonding roller 205B which is a cause of the defect will be performed.

In Modification Example 2, the controller of the maintenance display apparatus performs the following control. In other words, when the controller acquires shape data of a new winding body, the controller determines whether or not continuous positions of both ends of each of the first sheet material and the second sheet material are parallel to the reference lines. In a case where it is determined that the continuous positions are parallel to the reference lines, the controller does not perform a notification that maintenance work is to be performed. In a case where it is determined that the continuous positions are not parallel to the reference lines, the controller determines whether only one of a plurality of winding bodies wound on a plurality of winding cores is defective, or all of the plurality of winding bodies wound on the plurality of winding cores are defective.

In a case where only one of the plurality of winding bodies wound on the plurality of winding cores is defective, the controller performs a notification that a winding core on which the winding body determined as being defective is wound is to be maintained. On the other hand, in a case where all of the plurality of winding bodies wound on the plurality of winding cores are defective, the controller performs a notification that at least one of first bonding roller 205A and second bonding roller 205B is to be maintained.

In Modification Example 2, the controller may change a notification method depending on whether a tilt angle of continuous positions of both ends of each of the first sheet material and the second sheet material is less than or equal to a predetermined threshold value or is greater than the threshold value. With this configuration, it can be determined which one of plurality of winding cores 206, or first bonding roller 205A or second bonding roller 205B is to be maintained without generating facility state diagnosis model M and a notification thereof can be performed. However, since the first to third exemplary embodiments have higher accuracy in specifying a defect cause than Modification Example 2, the first to third exemplary embodiments are more preferable than Modification Example 2 in order to achieve the object of the present disclosure.

Modification Example 3

In the above-described exemplary embodiments, for the sake of description, the configuration in which maintenance display apparatus 100 (100A, 100B) includes storage 110 (110B), controller 120 (120A, 120B), and notifier 130 has been described, but the present disclosure is not limited thereto. As described in the exemplary embodiments, the storage and the controller may be configured separately from each other and disposed at distant positions as long as the storage and the controller are configured to be able to communicate with each other. The notifier may be included in a production apparatus or may be installed outside the production apparatus. The notifier may be connected to the storage and the controller via a network, or may be directly connected to the storage and the controller.

As described above, in the maintenance display apparatus according to the present disclosure, the storage, the controller, and the notifier may be separate devices that are independent from each other and may operate independently from each other. As long as the storage, the controller, and the notifier can communicate with each other, a place where they are disposed is not particularly limited. The notification device may be disposed in a factory or the like where the production apparatus is disposed, and the storage and the controller may be included in, for example, a so-called cloud server disposed on a cloud.

In the above-described exemplary embodiments, controller 120 (120A, 120B) has performed all the learning process, the update process, and the identification process. The learning process is a process of generating facility state diagnosis model M, and the update process is a process of updating facility state diagnosis model M. The identification process is a process of identifying whether or not an abnormality or a sign of an abnormality has occurred in plurality of produced new winding bodies 204 by using facility state diagnosis model M. In the identification process, controller 120 (120A, 120B) controls notifier 130 to perform the notification process. However, the present disclosure is not limited thereto.

For example, the controller may perform only the learning process or the update process, and the notifier may receive the facility state diagnosis model from the controller and perform the identification process by using the received facility state diagnosis model. With this configuration, it is possible to suppress an increase in an amount of communication between the controller and the notifier, and, even in a case where a plurality of notifiers are connected to the controller, a load of the identification process can be distributed to each notifier. Therefore, it is possible to prevent a processing delay due to processes being concentrated on the controller.

According to the present disclosure, it is possible to detect a sign of an abnormality in a facility.

The present disclosure is useful for a maintenance display apparatus that displays information regarding maintenance of a production facility.

What is claimed is:

1. A learned model generation method of generating a learned model for maintenance of a winding apparatus including
    a first supply reel that supplies a first electrode sheet,
    a second supply reel that supplies a second electrode sheet,
    a first bonding roller that is provided on a first electrode sheet side,
    a second bonding roller that is provided on a second electrode sheet side, and is paired with the first bonding roller to bond the first electrode sheet and the second electrode sheet to each other,
    a first winding core,
    a second winding core,
    a winding core rotation driver that, during a winding operation, moves the first winding core to a predetermined winding position, winds the first electrode sheet and the second electrode sheet on the first winding core in an overlapping manner, moves the second winding core to the predetermined winding position, and winds the first electrode sheet and the second electrode sheet on the second winding core in an overlapping manner, and
    a sensor that, during the winding operation, reads a first end surface of the first electrode sheet and a second end surface of the second electrode sheet along a radial direction of a first winding body in which the first electrode sheet and the second electrode sheet are wound in an overlapping manner by a plurality of turns on the first winding core, and reads a third end surface of the first electrode sheet and a fourth end surface of the second electrode sheet along a radial direction of a second winding body in which the first electrode sheet and the second electrode sheet are wound in an overlapping manner by a plurality of turns on the second winding core, the learned model generation method comprising:
    acquiring, using a controller and from the sensor, first group data including image data indicating a position of the first end surface read along the radial direction of the first winding body, second group data including image data indicating a position of the second end surface read along the radial direction of the first winding body, third group data including image data indicating a position of the third end surface read along the radial direction of the second winding body, and fourth group data including image data indicating a position of the fourth end surface read along the radial direction of the second winding body;
    comparing each of the first group data, the second group data, the third group data, and the fourth group data to predetermined reference data in order to determine if there is a defect present in the first winding body or the second winding body, the defect being determined based on a positional relationship among: 1) continuous positions of the third end surface indicated by the third group data, 2) continuous positions of the fourth end surface indicated by the fourth group data, and 3) reference lines included as the predetermined reference data;
    generating a first learned model using the third group data and the fourth group data, when it is determined that the second winding body has the defect, the first learned model outputting information indicating that the defect in the second winding body is caused by the second winding core;
    acquiring, using the controller and from the sensor, fifth group data indicating a position of a fifth end surface of the first electrode sheet along a radial direction of a third winding body in which the first electrode sheet and the second electrode sheet are wound in an overlapping manner by a plurality of turns on the first winding core and sixth group data indicating a position of a sixth end surface of the second electrode sheet along the radial direction of the third winding body,
    comparing each of the fifth group data and sixth group data to the predetermined reference data in order to determine if there is a defect present in the third winding body, the defect being determined based on a positional relationship among: 1) continuous positions of the fifth end surface indicated by the fifth group data, 2) continuous positions of the sixth end surface indicated by the sixth group data, and 3) reference lines as the predetermined reference data; and
    generating a second learning model, using the first group data, the second group data, the third group data, the fourth group data, the fifth group data, and the sixth group data, when it is determined that the third winding body has the defect, the second learning model outputting information indicating that the defect in the third winding body is caused by the first winding core;

determining a first maintenance plan to correct the second winding core, when the first learning model outputs information indicating that the defect in the second winding body is caused by the second winding core, and determining a second maintenance plan to correct the first winding core, when the second learning model outputs information indicating that the defect in the third winding body is caused by the first winding core; and outputting the first maintenance plan or the second maintenance plan to a display for performing correct action and correcting the defect in the second winding body or the third winding body.

2. The learned model generation method of claim 1, wherein
the first electrode sheet is a positive electrode sheet of a battery, and the second electrode sheet is a negative electrode sheet of the battery.

3. The learned model generation method of claim 1, wherein
the first electrode sheet is a negative electrode sheet of a battery, and the second electrode sheet is a positive electrode sheet of the battery.

4. The learned model generation method of claim 1, further comprising:
generating a first data set in which the first winding core is correlated with the first group data and the second group data, a second data set in which the second winding core is correlated with the third group data and the fourth group data, a first replacement data set in which the first winding core is correlated with the third group data and the fourth group data, and a second replacement data set in which the second winding core is correlated with the first group data and the second group data by using the first group data and the second group data, and the third group data and the fourth group data,
wherein an updated learning model is generated by using the first data set, the second data set, the first replacement data set, and the second replacement data set, the updated learning model outputting information indicating that the third winding body still has the defect and a cause of the defect is still the first winding core.

5. An apparatus outputting information for displaying information regarding maintenance of a winding apparatus including
a first supply reel that supplies a first electrode sheet,
a second supply reel that supplies a second electrode sheet,
a first bonding roller that is provided on a first electrode sheet side,
a second bonding roller that is provided on a second electrode sheet side, and is paired with the first bonding roller to bond the first electrode sheet and the second electrode sheet to each other,
a first winding core,
a second winding core,
a winding core rotation driver that, during a winding operation, moves the first winding core to a predetermined winding position, winds the first electrode sheet and the second electrode sheet on the first winding core in an overlapping manner, moves the second winding core to the predetermined winding position, and winds the first electrode sheet and the second electrode sheet on the second winding core in an overlapping manner, and a sensor that, during the winding operation, reads a first end surface of the first electrode sheet and a second end surface of the second electrode sheet along a radial direction of a first winding body in which the first electrode sheet and the second electrode sheet are wound in an overlapping manner by a plurality of turns on the first winding core, and reads a third end surface of the first electrode sheet and a fourth end surface of the second electrode sheet along a radial direction of a second winding body in which the first electrode sheet and the second electrode sheet are wound in an overlapping manner by a plurality of turns on the second winding core, the apparatus comprising:

a controller that acquires, from the sensor, first group data including image data indicating a position of the first end surface read along the radial direction of the first winding body, second group data including image data indicating a position of the second end surface read along the radial direction of the first winding body, third group data including image data indicating a position of the third end surface read along the radial direction of the second winding body, and fourth group data including image data indicating a position of the fourth end surface read along the radial direction of the second winding, and compares each of the first group data, the second group data, the third group data, and the fourth group data to predetermined reference data in order to determine if there is a defect present in the first winding body or the second winding body, the defect being determined based on a positional relationship among: 1) continuous positions of the third end surface indicated by the third group data, 2) continuous positions of the fourth end surface indicated by the fourth group data, and 3) reference lines included as the predetermined reference data; and a model generator that generates a first learned model using the third group data and the fourth group data, when it is determined that the second winding body has the defect, the first learned model outputting information indicating that defect in the second winding body is caused by the second winding core;

the controller acquires, from the sensor, fifth group data indicating a position of a fifth end surface of the first electrode sheet along a radial direction of a third winding body in which the first electrode sheet and the second electrode sheet are wound in an overlapping manner by a plurality of turns on the first winding core and sixth group data indicating a position of a sixth end surface of the second electrode sheet along the radial direction of the third winding body, and compares each of the fifth group data and sixth group data to the predetermined reference data in order to determine if there is a defect present in the third winding body, the defect being determined based on a positional relationship among: 1) continuous positions of the fifth end surface indicated by the fifth group data, 2) continuous positions of the sixth end surface indicated by the sixth group data, and 3) reference lines as the predetermined reference data;

the model generator generates a second learning model by using the first group data the second group data, the third group data, the fourth group data, the fifth group data and the sixth group data, when it is determined that the third winding body has the defect, the second learning model outputting information indicating that the defect in the third winding body is caused by the first winding core, the controller determines a first maintenance plan to correct the second winding core, when the first learning model outputs information indicating that the defect in the second winding body is caused by the second winding core, and determining a second maintenance plan to correct the first winding core, when the second learning model outputs information indicating that the defect in the third winding body is caused by the first winding core; and the controller outputs the first maintenance plan or the second maintenance plan to a display for performing correct action and correcting the defect in the second winding body or the third winding body.

6. A non-transitory computer readable recording medium storing a program executed by a computer generating a learned model for maintenance of a winding apparatus including a first supply reel that supplies a first electrode sheet, a second supply reel that supplies a second electrode sheet, a first bonding roller that is provided on a first electrode sheet side, a second bonding roller that is provided on a second electrode sheet side, and is paired with the first bonding roller to bond the first electrode sheet and the second electrode sheet to each other, a first winding core, a second winding core, a winding core rotation driver that, during a winding operation, moves the first winding core to a predetermined winding position, winds the first electrode sheet and the second electrode sheet on the first winding core in an overlapping manner, moves the second winding core to the predetermined winding position, and winds the first electrode sheet and the second electrode sheet on the second winding core in an overlapping manner, and a sensor that, during the winding operation, reads a first end surface of the first electrode sheet and a second end surface of the second electrode sheet along a radial direction of a first winding body in which the first electrode sheet and the second electrode sheet are wound in an overlapping manner by a plurality of turns on the first winding core, and reads a third end surface of the first electrode sheet and a fourth end surface of the second electrode sheet along a radial direction of a second winding body in which the first electrode sheet and the second electrode sheet are wound in an overlapping manner by a plurality of turns on the second winding core, the program causing the computer to execute procedures comprising:

acquiring, from the sensor, first group data including image data indicating a position of the first end surface read along the radial direction of the first winding body, second group data including image data indicating a position of the second end surface read along the radial direction of the first winding body, third group data including image data indicating a position of the third end surface read along the radial direction of the second winding body, and fourth group data including image data indicating a position of the fourth end surface read along the radial direction of the second winding body;

comparing each of the first group data, the second group data, the third group data, and the fourth group data to predetermined reference data in order to determine if there is a defect present in the first winding body or the second winding body, the defect being determined based on a positional relationship among: 1) continuous positions of the third end surface indicated by the third group data, 2) continuous positions of the fourth end surface indicated by the fourth group data, and 3) reference lines included as the predetermined reference data;

generating a first learned model using the third group data and the fourth group data, when it is determined that the second winding body has the defect, the first learned model outputting information indicating that defect in the second winding body is caused by the second winding core; and acquiring, from the sensor, fifth group data indicating a position of a fifth end surface of the first electrode sheet along a radial direction of a third winding body in which the first electrode sheet and the second electrode sheet are wound in an overlapping manner by a plurality of turns on the first winding core and sixth group data indicating a position of a sixth end surface of the second electrode sheet along the radial direction of the third winding body, and comparing each of the fifth group data and sixth group data to the predetermined reference data in order to determine if there is a defect present in the third winding body, the defect being determined based on a positional relationship among: 1) continuous positions of the fifth end surface indicated by the fifth group data, 2) continuous positions of the sixth end surface indicated by the sixth group data, and 3) reference lines as the predetermined reference data;

generating a second learning model using the first group data, the second group data, the third group data, the fourth group data, the fifth group data, and the sixth group data, when it is determined that the third winding body has the defect, the second learning model outputting information indicating that the defect in the third winding body is caused by the first winding core, determining a first maintenance plan to correct the second winding core, when the first learning model outputs information indicating that the defect in the second winding body is caused by the second winding core, and determining a second maintenance plan to correct the first winding core, when the second learning model outputs information indicating that the defect in the third winding body is caused by the first winding core; and outputting the first maintenance plan or the second maintenance plan to a display for performing correct action and correcting the defect in the second winding body or the third winding body.

* * * * *